(12) United States Patent
Florkey et al.

(10) Patent No.: US 10,912,415 B2
(45) Date of Patent: Feb. 9, 2021

(54) GAS FRYER AND METHODS HAVING UNIFORM HEAT EXCHANGE AND IMPROVED ACCESS FOR CLEANING

(71) Applicant: Henny Penny Corporation, Eaton, OH (US)

(72) Inventors: Edward J. Florkey, Vandalia, OH (US); Mark Gogel, Fairborn, OH (US); Steven Groll, Connersville, IN (US)

(73) Assignee: Henny Penny Corporation, Eaton, OH (US)

( * ) Notice: Subject to any disclaimer, the term of this patent is extended or adjusted under 35 U.S.C. 154(b) by 290 days.

(21) Appl. No.: 16/082,412

(22) PCT Filed: Mar. 17, 2017

(86) PCT No.: PCT/US2017/022997
§ 371 (c)(1),
(2) Date: Sep. 5, 2018

(87) PCT Pub. No.: WO2017/161290
PCT Pub. Date: Sep. 21, 2017

(65) Prior Publication Data
US 2019/0075969 A1    Mar. 14, 2019

Related U.S. Application Data

(60) Provisional application No. 62/309,650, filed on Mar. 17, 2016.

(51) Int. Cl.
*A47J 37/12* (2006.01)
*B08B 9/093* (2006.01)

(52) U.S. Cl.
CPC ....... *A47J 37/1266* (2013.01); *A47J 37/1223* (2013.01); *A47J 37/1247* (2013.01);
(Continued)

(58) Field of Classification Search
CPC . A47J 37/1266; A47J 37/1223; A47J 37/1247
(Continued)

(56) References Cited

U.S. PATENT DOCUMENTS

| 3,217,633 A | 11/1965 | Anetsberger |
| 3,667,374 A | 6/1972 | Holmes |

(Continued)

FOREIGN PATENT DOCUMENTS

| EP | 2140789 A1 | 1/2010 |
| KR | 20150014634 A | 2/2015 |

(Continued)

OTHER PUBLICATIONS

International Searching Authority, Search Report and Written Opinion issued in International Application No. PCT/US2017/022872 dated Jun. 12, 2017 (11 pages).

(Continued)

*Primary Examiner* — Tu B Hoang
*Assistant Examiner* — Thomas J Ward
(74) *Attorney, Agent, or Firm* — Wood Herron & Evans LLP

(57) ABSTRACT

A gas fryer and associated methods of cooking food products are disclosed. The gas fryer includes an infrared burner and a fry pot including an interior casing defining a cooking chamber, with the interior casing including a bottom wall and opposing sidewalls that extend upwardly from the bottom wall. The opposing sidewalls include lower, central, and upper sidewall panels that are angled from one another to define a tapered profile that narrows towards the bottom wall. The tapering of a well defined at a lower chamber portions of the cooking chamber allows for a shallow depth at this portion of the fry pot and easy visibility and access for (Continued)

cleaning. Furthermore, the opposing sidewalls and a rear end wall of the interior casing include heat exchange fins on an external surface.

12 Claims, 17 Drawing Sheets

(52) U.S. Cl.
CPC ....... *A47J 37/1261* (2013.01); *A47J 37/1271* (2013.01); *A47J 37/1285* (2013.01); *B08B 9/093* (2013.01); *B08B 2209/08* (2013.01)

(58) Field of Classification Search
USPC .............. 99/401, 403, 408; 126/344, 376.1
See application file for complete search history.

(56) References Cited

U.S. PATENT DOCUMENTS

| | | | |
|---|---|---|---|
| 3,735,693 | A | 5/1973 | Pelster et al. |
| 4,058,703 | A | 11/1977 | Price |
| 4,166,138 | A | 8/1979 | Ziminski et al. |
| 4,397,299 | A | 8/1983 | Taylor et al. |
| 4,502,373 | A | 3/1985 | Keating |
| 4,574,183 | A * | 3/1986 | Knauss ............... A47J 37/1261 219/438 |
| 4,769,249 | A | 9/1988 | Webb |
| 4,848,318 | A | 7/1989 | Brewer |
| 5,244,370 | A | 9/1993 | DeMars |
| 5,301,847 | A | 4/1994 | Fehr et al. |
| 5,611,330 | A | 3/1997 | Corliss et al. |
| 5,617,777 | A | 4/1997 | Davis et al. |
| 5,776,530 | A | 7/1998 | Davis et al. |
| 5,988,051 | A | 11/1999 | Hashiguchi et al. |
| 6,009,794 | A | 1/2000 | Casey et al. |
| 6,068,872 | A | 5/2000 | Hashiguchi et al. |
| 6,131,564 | A | 10/2000 | Song |
| 6,182,561 | B1 | 2/2001 | Garner et al. |
| 6,202,543 | B1 | 3/2001 | Moya et al. |
| 6,254,790 | B1 | 7/2001 | King et al. |
| 6,405,738 | B1 | 6/2002 | Clark et al. |
| 6,777,009 | B1 | 8/2004 | Shealy |
| 2005/0236402 | A1 | 10/2005 | Christiaansen et al. |
| 2006/0130670 | A1 | 6/2006 | Johnson et al. |
| 2007/0012367 | A1 | 1/2007 | Hotz et al. |
| 2008/0121578 | A1 | 5/2008 | Burkett et al. |
| 2009/0084273 | A1 | 4/2009 | Lackman et al. |
| 2010/0116345 | A1 | 5/2010 | Florkey et al. |
| 2010/0212510 | A1 * | 8/2010 | Hutson ............... A47J 37/129 99/331 |
| 2010/0300980 | A1 | 12/2010 | Burkett et al. |
| 2011/0129578 | A1 | 6/2011 | Feinberg et al. |
| 2013/0098847 | A1 | 4/2013 | Lambert et al. |
| 2014/0004234 | A1 | 1/2014 | Mosteller et al. |
| 2014/0020568 | A1 * | 1/2014 | Huang .................. F28F 1/025 99/403 |

FOREIGN PATENT DOCUMENTS

| | | |
|---|---|---|
| WO | 9406335 A1 | 3/1994 |
| WO | 2007035556 A2 | 3/2007 |

OTHER PUBLICATIONS

International Searching Authority, Search Report and Written Opinion issued in International Application No. PCT/US2017/022866 dated Jul. 24, 2017 (12 pages).
International Searching Authority, Search Report and Written Opinion issued in International Application No. PCT/US2017/022997 dated Aug. 17, 2017 (13 pages).
European Patent Office, Extended European Search Report issued in Application No. 17767590.7-1006 dated Aug. 13, 2019 (6 pages).
European Patent Office, Extended European Search Report issued in Application No. 17767646.7-1006 dated Aug. 13, 2019 (7 pages).
European Patent Office, Extended European Search Report issued in Application No. 20185641.6-1004 dated Sep. 1, 2020 (6 pages).

* cited by examiner

GAS FRYER AND METHODS HAVING UNIFORM HEAT EXCHANGE AND IMPROVED ACCESS FOR CLEANING

CROSS-REFERENCE TO RELATED APPLICATION

This application claims the benefit of Provisional Application Ser. No. 62/309,650, filed Mar. 17, 2016, the disclosure of which is incorporated by reference herein.

TECHNICAL FIELD

The invention generally relates to oil fryers for cooking food and, in particular, to devices and methods for improving the periodic maintenance of a fryer and for efficiently transferring heat energy into a cooking medium in the fryer.

BACKGROUND

Oil-based frying is commonly used as a cooking method for a wide range of food, such as poultry, fish, potato products, and the like. Commercial fryers include one or more fry pots (also referred to as cooking chambers) that are filled with a cooking medium such as oil or solid fats. Heat is typically provided to the cooking medium using an electrical heating element submerged in the cooking medium or a gas burner thermally coupled to the cooking medium though the walls of the fry pot. When the cooking medium reaches a preset cooking temperature, food products are placed into the cooking medium for a predetermined amount of time during which the food products are cooked by heat from the cooking medium. To facilitate insertion and removal of the food products, the food products are typically placed inside a container, such as a wire basket, and the container lowered into the cooking medium for the predetermined amount of time.

The cooking medium is normally re-used for multiple cooking cycles, which may include cooking cycles for different food products. However, the cooking medium degrades over time. This degradation may be due to contamination by particles shed by the food products being cooked and from chemical degradation due to heat, oxidation, and reactions with the food products. In addition, as food particles accumulate in the cooking medium, the flavor characteristics of the food particles may become infused in the cooking medium. This infusion may adversely affect the quality of cooked food. For at least these reasons, the cooking medium must occasionally be replaced and/or filtered. Likewise, the cooking chamber itself may require periodic cleaning to remove any particulate (crackling, crumbs, and/or small pieces of food product) and debris remaining on the surfaces of the cooking chamber before returning the filtered or new cooking medium back into the cooking chamber for more cooking cycles.

The manual cleaning of the internal surfaces of the cooking chamber is typically difficult with conventional designs of gas fryers. To this end, a gas-heated fryer typically defines a predetermined internal geometry based, at least in part, on the size of burners that must be located outside the cooking chamber to provide heat energy to control the temperature of the cooking medium. One example of a typical conventional gas fryer is shown at FIG. 17. This fryer 800 includes a cooking chamber 802 defined by opposing sidewalls 804 and end walls. The cooking chamber 802 has a large upper portion 802a for receiving a container of the food products to be cooked by heated cooking medium, and a narrowed lower portion 802b extending from the upper portion 802a. The lower portion 802b is sized such that gas heating elements 806 can be mounted along the opposing sidewalls 804 on the outside of the cooking chamber 802. The oil or cooking medium contained within the lower portion 802b helps carry heat energy upwardly into the remainder of the cooking chamber 802 during operation of the fryer 800.

However, while the lower portion 802b is sized for effectiveness of heat exchange, the cleaning of such an elongated narrow area when reaching into the cooking chamber 802 from a top opening thereof is made very difficult thanks to this geometry. The fryer 800 is often cleaned while it is still hot to reduce downtime, and the narrow geometry of the lower portion 802b may lead to user contacts with the sidewalls 804, which may be at a high temperature. Moreover, the drain on fryers 800 is typically oriented horizontally and positioned at a very bottom of the lower portion 802b, and such positioning makes the drain exceedingly difficult to clean, particularly when the fryer 800 is still hot. It can therefore be difficult to obtain a thorough cleaning of these areas without providing specialized equipment for doing so, and that lack of easy cleaning can lead to particulate and debris remaining in the fryer, causing the adverse effects described above in future cooking cycles.

Additionally, the size and the configurations of gas heating elements used in these conventional designs often leads to development of "hot spots," e.g., zones on the cooking chamber that are much hotter than other zones. Those hot spots can lead to highly non-uniform heat transfer into the cooking medium, and this is known to contribute to faster degradation of the cooking medium. Accordingly, conventional gas fryer designs tend to require more frequent replacement of the cooking medium, lowering the cost efficiencies of operating the fryer.

It would thus be desirable to provide a cooking chamber or fry pot with one or more features that help improve the life span of cooking medium used in the fryer. More particularly, it would be desirable to make periodic cleaning of the chamber easier, while also improving uniformity of heat exchange during cooking operations at the fryer.

SUMMARY

In one illustrative embodiment of the invention, a gas fryer is provided so as to include a fry pot with an interior casing defining a cooking chamber configured to receive cooking medium that is heated to cook food products. The interior casing includes a bottom wall, front a rear end walls extending from the bottom wall, and opposing sidewalls connected to the front and rear end walls and also extending from the bottom wall. The fry pot includes an exterior casing spaced apart from the interior casing in several locations to define a plenum for air flow around an external surface of the interior casing. The fryer also includes a plurality of heat exchange fins that are connected to the interior casing at portions of the opposing sidewalls and the rear end wall, the heat exchange fins extending between the interior casing and the exterior casing to form flow channels for air flow in the plenum. The fryer further includes at least one infrared burner that generates heat energy by combustion of gas for heating cooking medium in the fry pot. The heat energy from the infrared burner is transferred by radiation into the interior casing and also by convection into the interior casing based on air flow through the plenum that is heated by the infrared heater. Moreover, the plurality of heat exchange fins is arranged in a configuration that guides the air flow to make transfer of the heat energy into the interior casing and the cooking medium generally uniform across at least the opposing sidewalls and the rear end wall. The uniform heating advantageously avoids the formation of high temperature hot spots within the cooking medium that could degrade the cooking medium and otherwise reduce its lifespan.

In another embodiment of the invention, a gas fryer for cooking food products includes a fry pot and at least one infrared burner that generates heat energy. The fry pot includes an interior casing defining a cooking chamber configured to receive cooking medium that is heated to cook the food products, with the interior casing including a bottom wall and opposing sidewalls extending from the bottom wall. Each of the opposing sidewalls further includes an upper sidewall panel extending generally vertically from an opening into the cooking chamber, a central sidewall panel connected to and extending at an angle from the upper sidewall panel to define a flank of the cooking chamber, and a lower sidewall panel connected to and extending at an angle from the central sidewall panel to define a well of the cooking chamber. The lower sidewall panels are angled from a vertical orientation by a well angle, and the central sidewall panels are angled from a horizontal orientation by a flank angle. The well angle and the flank angle are both acute angles such that the flank and the well of the cooking chamber define a tapered profile that narrows in width towards the bottom wall. The well width at a top of the well is therefore larger in size than the bottom wall width at a bottom of the well, which improves access and visibility for cleaning the well and the cooking chamber when that process is required.

In a further embodiment, a method of cooking food products is provided. The method includes analogous features to the fryers described above, including the generally uniform transfer of heat energy from at least one infrared burner into the fry pot, via radiation and convection with the convection assisted by a plurality of heat exchange fins provided on the external surface of the fry pot.

The heat exchange features provided on an exterior of the fry pot and the angling and profile of walls within the interior casing collectively provides several benefits. In this regard, the shallower depth and tapered design of the well allows for easier access for cleaning and the use of an easy-to-clean vertical drain port, while also reducing the size of the infrared burners and air flow that needs to be used. The cooking chamber contains less cooking medium overall thanks to the shallower depth at these portions of the cooking chamber. Furthermore, cooking medium usage is also reduced because solid particulate and other debris is encouraged by the profile of the interior casing to move to the bottom of the well along the bottom wall rather than stick and burn on heated surfaces such as the lower and central sidewall panels, and this lack of burning crumbs or crackling increases the useable lifespan of the cooking medium. Moreover, the use of the smaller burners in combination with air flow through the plenum and heat exchange fins spreads the heat exchange to be generally uniform across a substantial portion of the external surface of the fry pot. This uniform heat exchange heats the cooking medium in a controlled, uniform manner as well, which avoids overheating and hot spots that could rapidly degrade cooking medium quality. In combination, the use of less overall cooking medium volume and the increase of lifespan of the cooking medium, which is enabled by the uniform heating and the easier cleaning/removal of particulate, collectively leads to a reduction in cooking medium use compared to conventional fryer designs.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Embodiments of the invention are directed to fryers and methods of controlling a fryer, and in particular, for improving the operational efficiencies of the fryer as well as improving the life span of cooking medium that is used within the fryer. To this end, the cooking chambers of the fryer in all embodiments are designed with several heat exchange elements along an exterior thereof to help promote uniform heat exchange between the heat sources and the cooking medium. Moreover, the particular heat exchange elements used with the fryer also enable a redesign of the internal profile and shape of the cooking chamber, the profile configured to minimize cooking medium use while also being easy to clean when manual deep cleaning is required periodically. By improving the reliability of cleaning particulate and debris from the cooking chamber and assuring uniform heating during cooking cycles, the fryers of the embodiments described herein help maximize the useable life span of the cooking medium and therefore operate more efficiently than conventional fryer designs.

Figure 1:
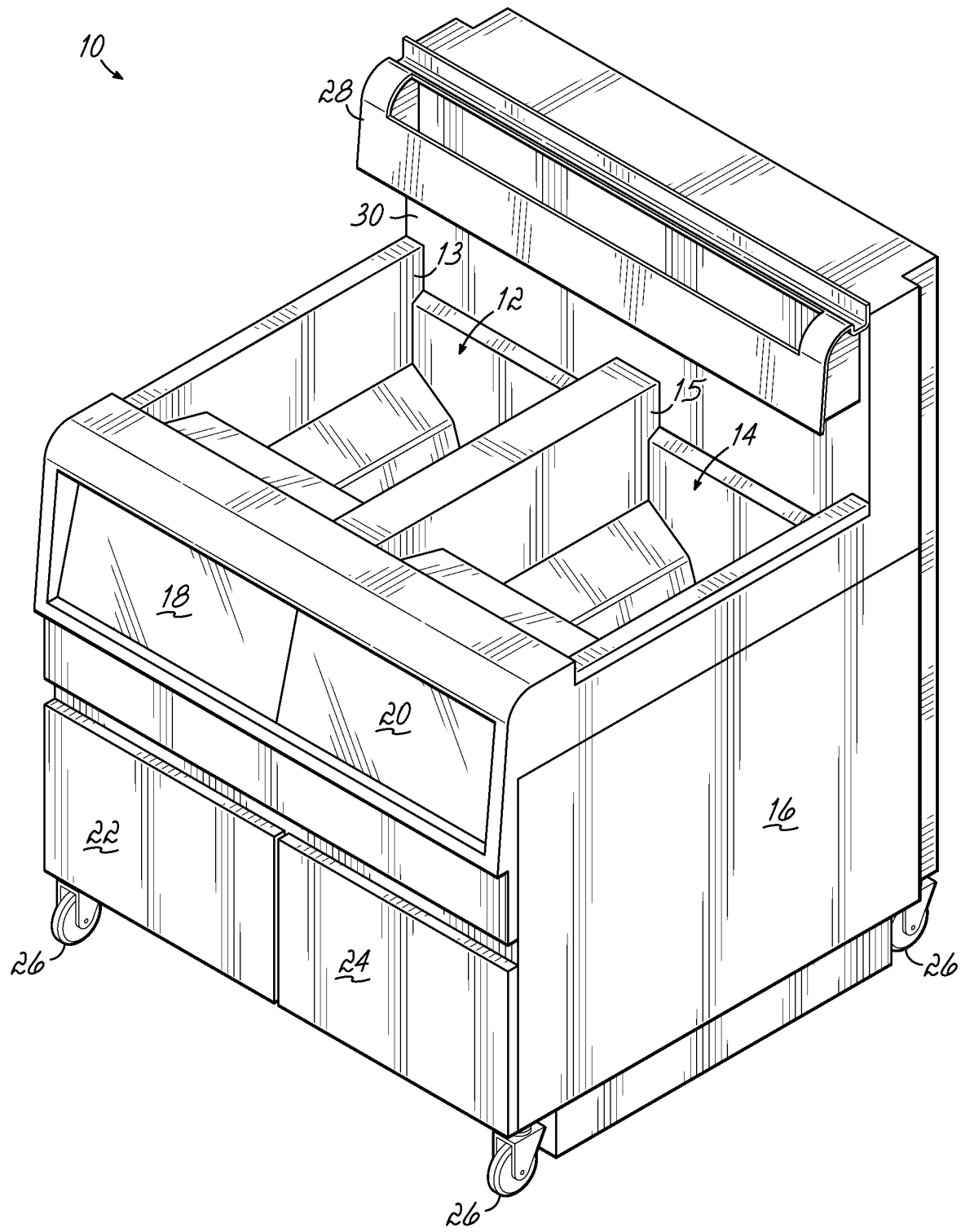
FIG. 1 is a top perspective view of a gas fryer according to an embodiment of the invention, the gas fryer including two fry pots defining cooking chambers.

Turning with specific reference to the drawings, FIG. 1 depicts an exemplary fryer 10 in accordance with one embodiment of the invention. The fryer 10 includes fry pots 12, 14 (also referred to herein as cooking chambers), a cabinet 16, control panels 18, 20, access panels 22, 24, wheels 26, a basket hanger 28, and a backsplash 30. Each of the fry pots 12, 14, cabinet 16, access panels 22, 24, basket hanger 28, and backsplash 30 may be constructed from stainless steel, mild steel, or some other suitable material. Each fry pot 12, 14 includes a respective opening 13, 15 though which a food product may be placed into the fryer 10.

Food products may be placed into the fry pots 12, 14, for example, by lowering a basket containing the food product into the fry pot 12, 14. At completion of a cooking cycle, the basket may be removed from the fry pot 12, 14 and hung from the basket hanger 28 to allow excess cooking medium to drain back into the fry pot 12, 14. Each of the fry pots 12, 14 may be associated with a corresponding one of the control panels 18, 20 to provide a human-machine interface for operating the fryer 10. The control panels 18, 20 may receive commands from, and display information regarding a status of the fryer 10 to an operator. The access panels 22, 24 may provide access to the interior of cabinet 16 to, for example, service the components of the fryer 10.

Exemplary fryer 10 is depicted as having a separate control panel 18, 20 for each fry pot 12, 14. However, it should be understood that one control panel could be configured to control multiple fry pots, and embodiments of the invention are not limited to fryers having a separate control panel for each fry pot. In addition, although the fryer 10 depicted in FIG. 1 is a gas-heated open fryer having two fry pots, it should be further understood that embodiments of the invention may also be used with pressure fryers and/or electrically heated fryers, as well as fryers having a different number of fry pots.

Figure 2:
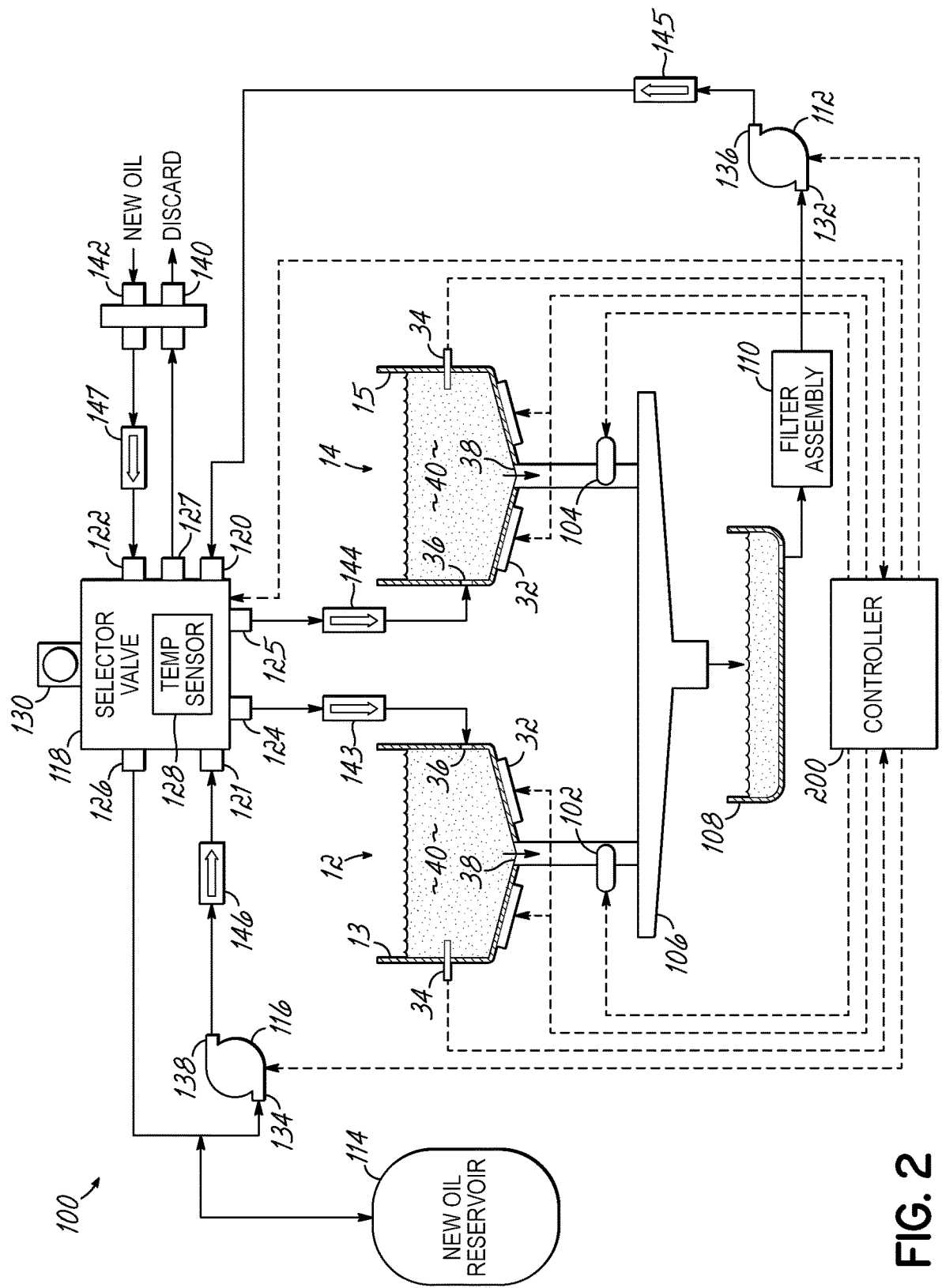
FIG. 2 is a diagrammatic schematic view of the fryer of FIG. 1, depicting a plurality of fry pots, a filtration/recirculation system, and a controller.

Referring now to the schematic view of the fryer 10 in FIG. 2, in addition to fry pots 12, 14, the fryer 10 may include a cooking medium handling system 100 and a controller 200. Many of the elements of the cooking medium handling system 100 (also referred to as a filtration or recirculation system) described below are well understood in the fryer field, but a brief description of some of these elements follows to fully explain the environment of the overall fryer 10. Each fry pot 12, 14 may include a heating element 32, schematically shown, a temperature sensor 34, a fill port 36, and a drain port 38, and may be at least partially filled with a cooking medium 40. Suitable cooking mediums may include plant-based fats, animal-based fats, and/or synthetic (e.g., hydrogenated) fats. The heating element 32 of this invention includes a gas heating element (e.g., a gas burner and heat exchanger that transfers heat from the burner to the cooking medium 40). Further details regarding the heating element 32 and other associated heat exchange features are provided below with reference to non-schematic FIGS. 3 through 10. In any event, it will be understood that the schematic representations of the fry pots 12, 14 and the heating element 32 in FIG. 2 is merely a simplified representation for the purposes of showing the recirculation and filtration plumbing in greater detail.

The cooking medium handling system 100 may include drain valves 102, 104, a drain manifold 106, a drain pan 108, a filter assembly 110, a filter pump 112, a reservoir 114 of fresh cooking medium, a reservoir pump 116, and a selector valve 118. The selector valve 118 may include a plurality of input ports 120-122 and a plurality of output ports 124-127. A temperature sensor 128 may be located in the selector valve 118, or in another suitable location, to enable the controller 200 to determine the temperature of the cooking medium passing through the cooking medium handling system 100.

The selector valve 118 is configured to selectively fluidically couple one or more of the input ports 120-122 to one or more of the output ports 124-127. To this end, the selector valve 118 may comprise a rotary valve having a transverse plug (not shown) coupled to a motor 130. The motor 130 may cause the selector valve 118 to fluidically couple a selected input port to a selected output port by rotating the transverse plug to one of a plurality of predetermined positions. In an alternative embodiment of the invention, the selector valve 118 may comprise an assembly of valves that are configured to provide the desired selective fluidic coupling in response to signals from the controller 200. In this alternative embodiment, the selector valve 118 may comprise an assembly including a plurality of valves connected to a manifold.

The filter pump 112 and reservoir pump 116 may each include an inlet 132, 134 on a suction side of the pump, and an outlet 136, 138 on a pressure side of the pump. The inlet 132 of filter pump 112 may be fluidically coupled to the drain pan by the filter assembly 110, and the outlet 136 of the filter pump 112 may be fluidically coupled to an input port 120 of selector valve 118. Activation of the filter pump 112 may cause cooking medium 40 to be drawn from the drain pan 108 through the filter assembly 110 and provided to selector valve 118. The selector valve 118 may in turn provide the filtered cooking medium 40 to one of the fry pots 12, 14 for reuse and/or to a discard port 140 for disposal.

Although filter assembly 110 is depicted as being coupled to the inlet 132 of filter pump 112 in the exemplary embodiment illustrated by FIG. 2, it should be understood that the cooking medium handling system 100 is not limited to the specific arrangement of components depicted. For example, the filter assembly 110 could be coupled to the outlet 136 of filter pump 112 rather than the inlet 132 so that cooking medium 40 is pushed through the filter assembly 110 rather than drawn through the filter assembly 110. In either case, the filter assembly 110 may include a housing configured to accept a filter for filtering the cooking medium 40. Regular use of filtration cycles to clean the cooking medium 40 may reduce consumption of cooking medium 40 and increase the availability of the fryer 10 by providing hot filtered cooking medium 40 to the fry pots 12, 14.

The inlet 134 of reservoir pump 116 may be fluidically coupled to the reservoir 114, and the outlet 138 of the reservoir pump 116 may be fluidically coupled to an input port 121 of selector valve 118. Activation of reservoir pump 116 may cause cooking medium 40 to be drawn from reservoir 114 and provided to selector valve 118. The selector valve 118 may in turn provide the fresh cooking medium 40 to one of the fry pots 12, 14 to refill or replenish the cooking medium 40. A fill port 142 may be coupled to an input port of the selector valve 118 to facilitate the addition of cooking medium 40 to the reservoir 114. The cooking medium handling system 100 may further include check valves 143-147 that prevent cooking medium 40 from back-flowing from the fry pots 12, 14 into the selector valve 118, or from the selector valve 118 into either of the filter pump 112, reservoir pump 116, or fill port 142.

The controller 200 may be in communication with the heating element 32 and temperature sensor 34 of each of the fry pots 12, 14, the drain valves 102, 104, filter pump 112, reservoir pump 116, and temperature sensor 128 and motor 130 of selector valve 118. The controller 200 may control the various cooking and maintenance cycles of the fryer 10 by transmitting signals to, and receiving signals from these components of the fryer 10. The controller 200 may also be coupled to the control panels 18, 20 to provide operating information to, and receive input from the operator of the fryer 10. The controller 200 may control the temperature of the cooking medium 40 in each fry pot 12, 14 by selectively activating the respective heating element 32, and may control the filtering and addition of cooking oil by selectively activating the drain valves 102, 104, filter pump 112, reservoir pump 116, and motor 130 of selector valve 118.

Turning to FIGS. 3 through 11, one of the fry pots 12 defining a cooking chamber is shown in further detail. The fry pot 12 includes an interior casing 210 and an exterior casing 212, the latter being shown exploded apart from the interior casing 210 in FIG. 5. The interior casing 210 defines the cooking chamber which receives the cooking medium 40 to be heated for cooking cycles. As described in further detail below, the interior casing 210 is defined by side walls, end walls, and a bottom wall that collectively provide a chamber that is easy to clean and that minimizes cooking medium usage. The exterior casing 212 of this embodiment is formed with a double-wall construction, specifically defined by outermost casing panels 214 and air plenum casing panels 216 spaced from and positioned between the outermost casing panels 214 and the interior casing 210. As explained further below, the air plenum casing panels 216 and the interior casing 210 collectively enclose an air flow path in which forced air flows to transfer heat energy from infrared burners 218 (serving as the heating elements 32 previously described generically) into the interior casing 210 and the cooking medium within the fry pot 12. However, it will be understood that the particular construction of the exterior casing 212 may be modified in other embodiments without departing from the scope of this invention.

With continued reference to FIGS. 3 through 5, the interior casing 210 of the fry pot 12 is specifically defined by a bottom wall 222 (not clearly visible until cross sections described further below), opposing sidewalls 224 extending upwardly from the bottom wall 222, and front and rear end walls 226, 228 extending upwardly from the bottom wall 222 and between the opposing sidewalls 224 to substantially enclose the cooking chamber. The opposing sidewalls 224 are substantially identical mirror images of one another in this embodiment, with each opposing sidewall 224 including multiple sidewall portions that are angled to cause the cooking chamber to taper inwardly towards the bottom wall 222. The opening 13 into the cooking chamber previously described with reference to FIG. 1 is defined along the top of the opposing sidewalls 224 and the top of the front and rear end walls 226, 228, and it is readily understood that the opening 13 is the largest portion of the cooking chamber. In addition to the cooking medium 40, the interior casing 210 may receive additional elements such as a rack 230 (effective for holding a wire basket of food product in position within the cooking medium, among other purposes) without departing from the scope of the invention. In short, the interior casing 210 defining the cooking chamber of this fryer 10 defines a generally rectangular shape when viewed from the top or bottom thereof, which simplifies the construction and assembly of the exterior casing 212 relative to the interior casing 210.

Figure 3:
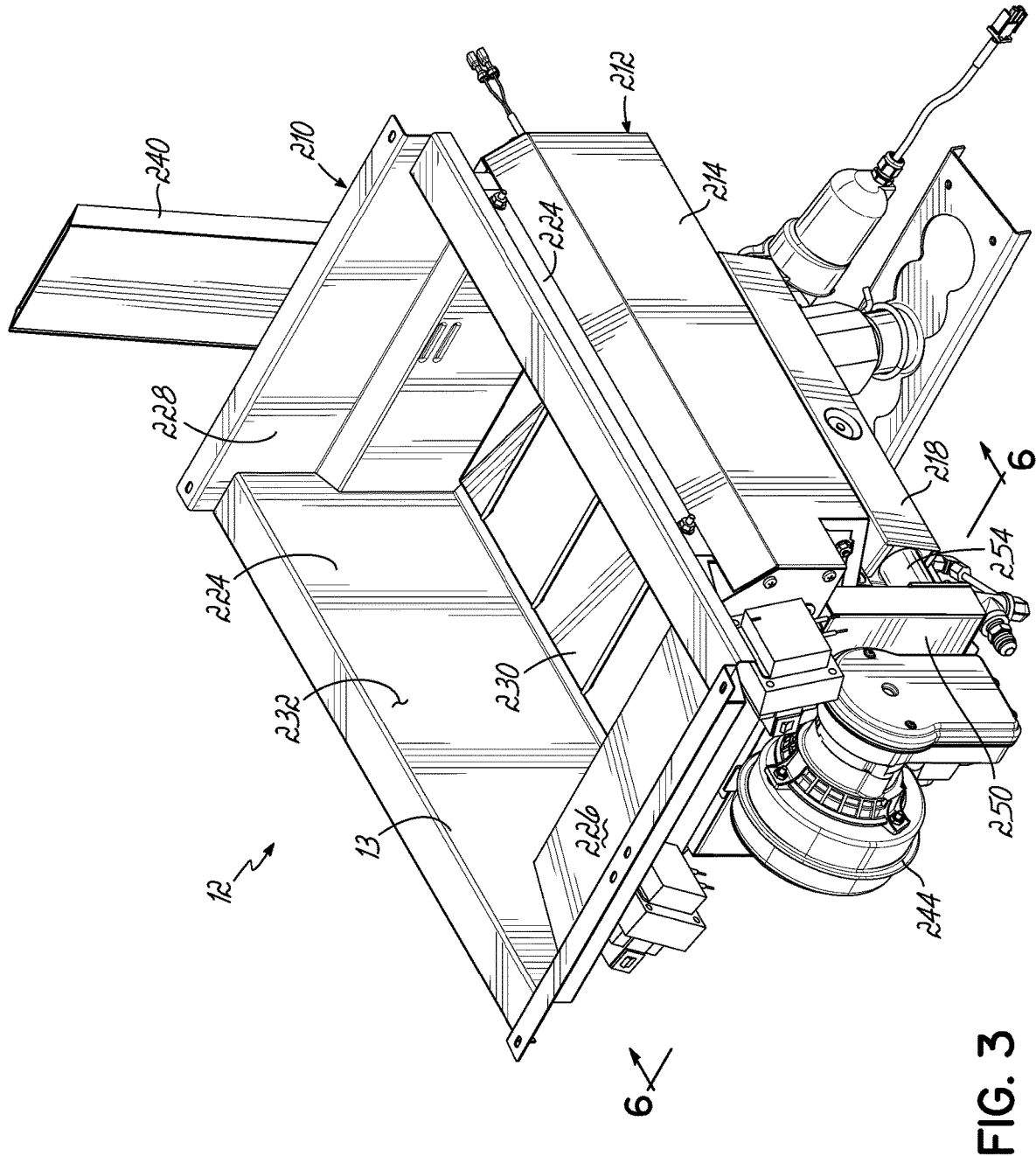
FIG. 3 is a top front perspective view of one of the fry pots removed from the outer casing of the fryer of FIG. 1, to thereby show heat exchange features along an exterior thereof.
Figure 4:
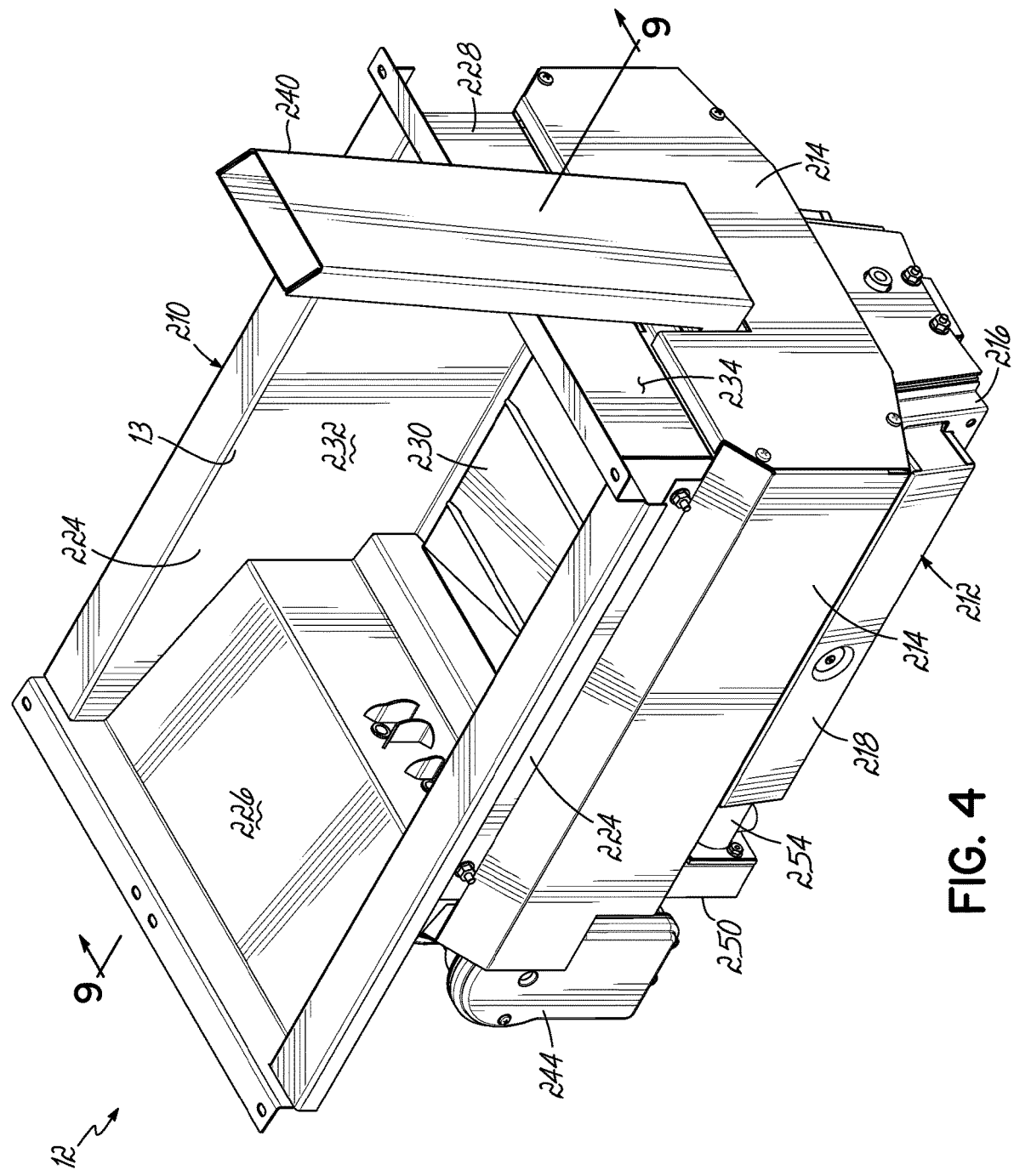
FIG. 4 is a top rear perspective view of the fry pot of FIG. 3.
Figure 5:
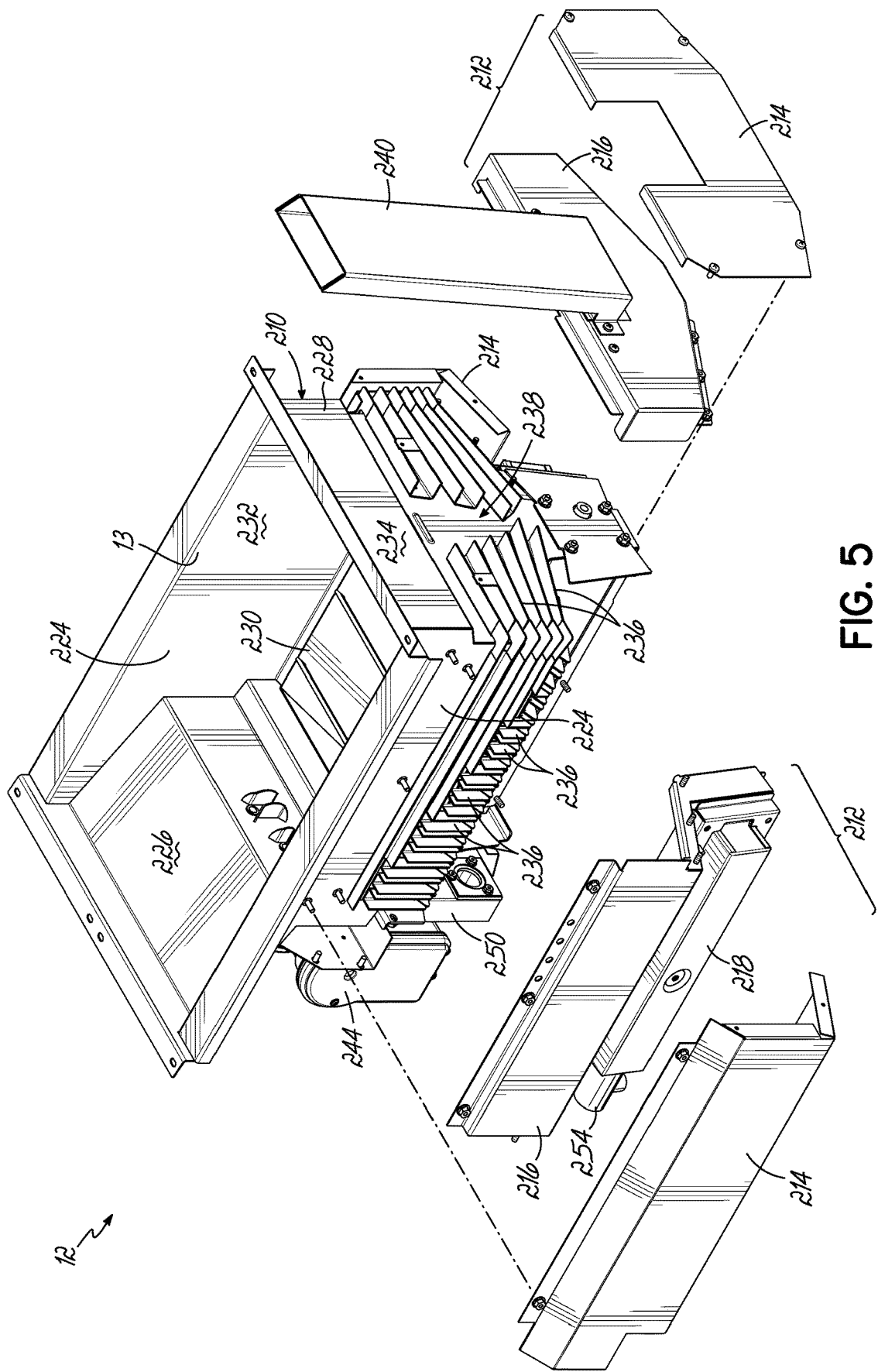
FIG. 5 is a partially exploded perspective view of the fry pot of FIG. 4, thereby revealing a plurality of heat exchange fins mounted on outer surfaces of an interior casing of the fry pot.

The various elements of the interior casing 210 collectively define an internal surface 232 facing towards the cooking medium in the cooking chamber, and an external surface 234 facing outwardly towards the outer cabinet 16 of the fryer 10 (not shown in these FIGS. 3 through 5). A plurality of heat exchange fins 236 are coupled to the external surface 234 to provide passages for heated air flow around a substantial portion of the periphery of the cooking chamber defined by the interior casing 210. More specifically, the opposing sidewalls 224 and the rear end wall 228 have heat exchange fins 236 welded into place or otherwise fixedly secured to the external surface 234 thereof. The specific arrangement and functionality of the heat exchange fins 236 and their passages is described in further detail below, but generally speaking, these heat exchange fins 236 help promote uniform heat exchange between heated exhaust air from the IR burners 218 and the cooking medium 40 within the fry pot 12. In addition, the specific profiles and dimensions defined within the cooking chamber by the interior casing 210 is described in further detail with reference to at least FIG. 11 below.

Having described the interior casing 210 in some detail, the next element shown in detail in FIGS. 3 through 5 is the air plenum casing panels 216 of the exterior casing 212. The air plenum casing panels 216 are shown as extending along each of the opposing sidewalls 224 and the rear end wall 228 of the interior casing 210. To this end, the air plenum casing panels 216 are mounted so as to engage or be adjacent to outermost ends of the heat exchange fins 236 located along the external surface 234 defined at these elements. As a result, a gap or plenum 238 for air flow around the interior casing 210 is defined between the air plenum casing panels 216 and the corresponding portions of the opposing sidewalls 224 and the rear end wall 228. This "plenum" 238 is effectively enclosed between the interior casing 210 and the air plenum casing panels 216 such that air flow through the system is maintained at desired locations adjacent the interior casing 210 before being exhausted via an exhaust chimney 240 coupled to the air plenum casing panel 216 located along the rear end wall 228. The exhaust chimney 240 is typically placed so as to feed hot exhaust air to a vent hood or other ventilation system located above the fryer 10 as is typical in restaurant settings. More specifically, in this embodiment the only outlet for flow from the plenum 238 is at the exhaust chimney 240 to avoid discharge of hot exhaust air in undesired locations, such as around the front end of the fryer 10 where an operator may be located during use of the fryer 10.

In a similar fashion, the only inlets into the plenum 238 are defined by outlets (not shown) of the IR burners 218, which are mounted in the air plenum casing panels 216 that are located along the opposing sidewalls 224. Each of the air plenum casing panels 216 is removably mounted to the corresponding portions of the interior casing 210, such as by threaded fasteners or the like. Thus, by having the IR burners 218 mounted on the air plenum casing panels 216, the connection of these casing panels 216 to the interior casing 210 automatically positions the IR burners 218 at an accurate position proximate to the opposing sidewalls 224 at lower ends thereof. More particularly, the IR burners 218 are positioned at a small gap from the opposing sidewalls 224, this gap being defined by the plenum 238 at its inlet end. This positioning allows for heat energy to be transferred into the cooking medium 40 by radiation as well as convection. It will be appreciated that the IR burners 218 could be separately mounted or otherwise provided at the desired position in other embodiments without departing from the scope of this invention.

The IR burners 218 may be a commercially available heating element that is installed at the air plenum casing panels 216 as shown in these Figures. The IR burners 218 are advantageously of a smaller size and higher-density wattage as compared to most conventional gas-heated fryer designs (or alternatives such as WCF or tile burners), but sufficient heat energy transfer into the cooking medium 40 for cooking operations is enabled by the positioning of the IR burners 218 and the air flow through the plenum 238, which causes generally uniform heat exchange over several major surfaces at the external surface 234 of the interior casing 210. To this end, the specific construction of the IR burners 218 shown in these drawings is not the only design that could be used with the advantageous new features of the fryer 10 and fry pot 12 designs disclosed in this application. Likewise, the specific operation of the IR burners 218 is the same as well understood in this art, and therefore is not described in further detail herein.

FIGS. 3 through 5 also show the outermost casing panels 214 in further detail. Just like the air plenum casing panels 216, the outermost casing panels 214 are positioned along each of the opposing sidewalls 224 and the rear end wall 228 of the interior casing 210. The outermost casing panels 214 are also secured removably to the corresponding sides of the interior casing 210 with threaded fasteners or the like. The outermost casing panels 214 are generally spaced from the air plenum casing panels 216 so as to provide a further gap from the area which receives the flow of heated air running through the IR burners 218. To this end, the outermost casing panels 214 help isolate the hotter zones or components of the fry pot 12 from other components within the cabinet 16 of the fryer 10. The outermost casing panels 214 generally do not form part of the air flow path or plenum 238 and therefore are somewhat isolated from the primary heat exchange features and elements provided on the fry pot 12. It will be understood that these outermost casing panels 214 may be formed from the same types of materials as the remainder of the fry pot 12 (e.g., stainless steel or the like), or alternatively, could be formed from an insulating material or some other material without departing from the scope of the embodiments described herein.

As can also be seen from FIG. 3, for example, the fry pot 12 and its components are coupled to the controller 200 and sources of electrical energy (or gas, in the case of the IR burners 218) by various cords and conduits, some of which are shown in this drawing view. However, these elements will be well-understood to be conventional and therefore are not described in further detail here.

Also shown in FIG. 3, a blower 244 may be mounted at the exterior of the fry pot 12 such as adjacent the area of the front end wall 226. The blower 244 is typically a motor-driven fan element that produces an air flow that moves through the IR burners 218 and the plenum 238 to help spread the heat energy by convection around a majority of the external surface 234. As will be appreciated, the blower 244 is a commercially-available device installed along the exterior casing 212 or some other portion of the fry pot 12. Of course, the particular type and positioning of the blower 244 and even the number of blowers may be modified in other embodiments, so long as there is some mechanism provided for generating air flow through the plenum 238.

Figure 6:
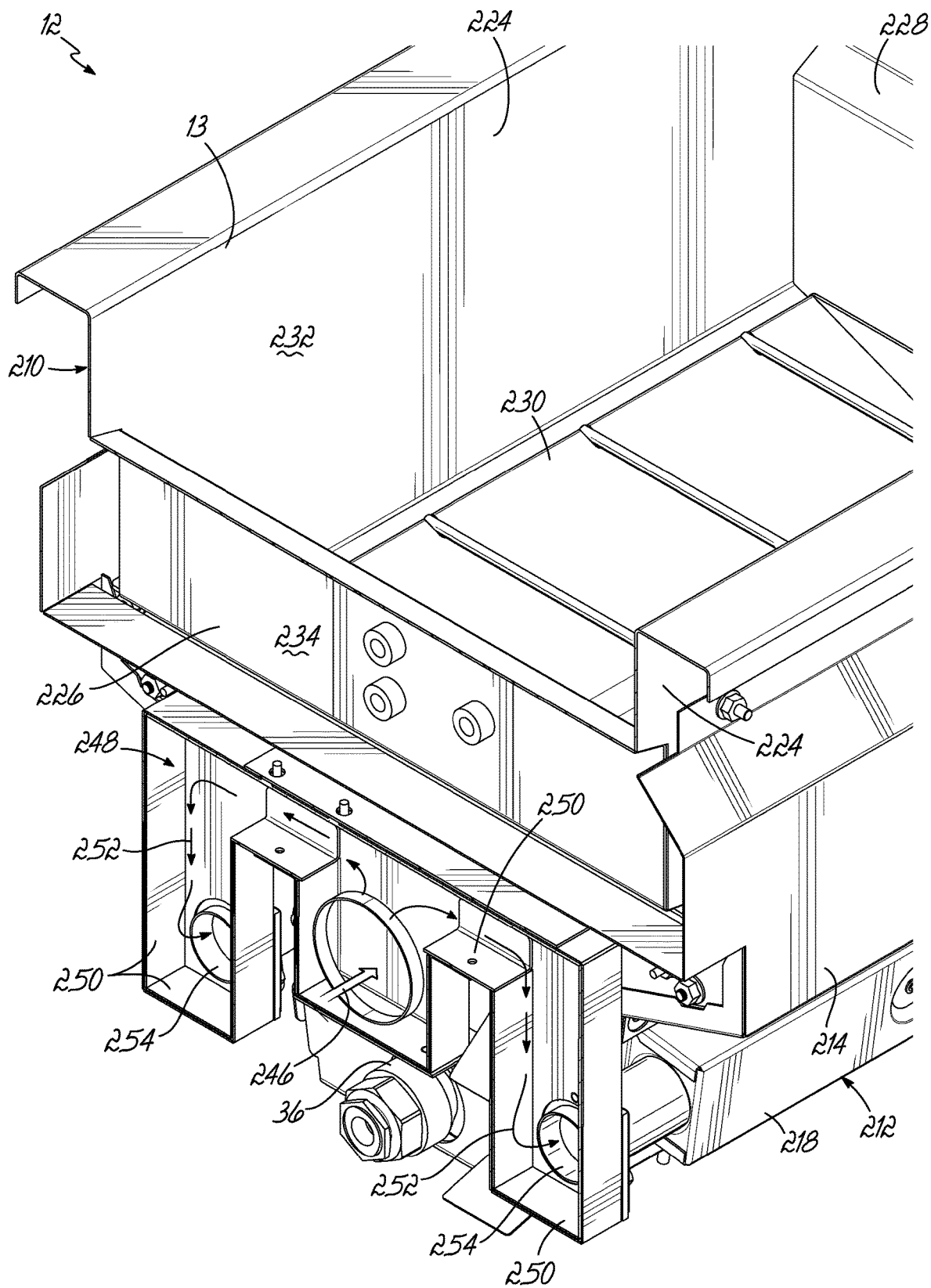
FIG. 6 is a cross-sectional perspective view of a front portion of the fry pot of FIG. 3, with the cross section taken at a position underneath an exterior casing of the fry pot to reveal air flow paths between a blower and heating elements.

Additional features of the plenum 238 and the components described above for directing air flow around the external surface 234 are shown in further detail in FIGS. 6 through 10. To this end, FIG. 6 illustrates a partial cross section taken along a front portion of the fry pot 12, but outside the front end wall 226 at a lower end of the cooking chamber. Incoming air flow generated by the blower 244 is shown at arrow 246, and this air flow then divides and moves into two branches of a feed plenum 248 defined by front casing panel elements 250 positioned along the front end wall 226 between the blower 244 and the IR burners 218. This further air flow through the feed plenum 248 is shown at arrows 252 in FIG. 6. From the feed plenum 248, the air flow continues into inlets 254 of the IR burners 218 that communicate with the feed plenum 248. Although the single blower 244 is thereby configured to feed air flow into the IR burners 218 and plenum 238 along both opposing sidewalls 224 in the illustrated embodiment, it will be understood that separate blowers could be provided or otherwise connected to generate flow in the individual IR burners 218 and sides, in other embodiments of the invention.

Figure 7:
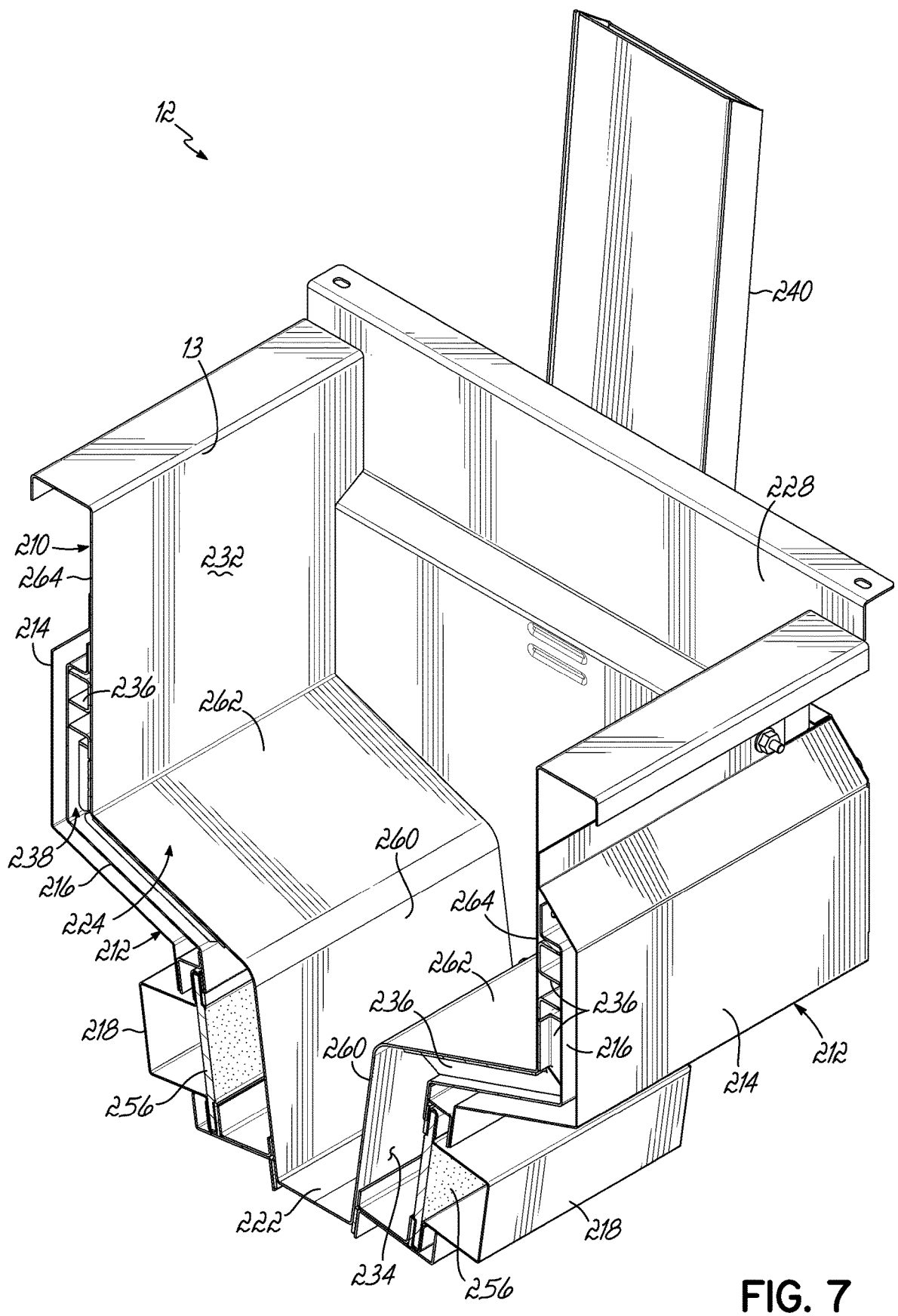
FIG. 7 is a cross-sectional perspective view similar to FIG. 6, but taken along a central portion of the fry pot of FIG. 3.

Some or all of the air flow provided through the inlets 254 of the IR burners 218 may then be used in the combustion process to produce the heat energy to be delivered into the cooking medium 40 within the fry pot 12. The specific internal elements and operational features of the IR burners 218 are not shown in these Figures. With reference now to FIG. 7, which shows a cross section taken along a central portion of the fry pot 12, further flow of the air as it exits the IR burners 218 is revealed in further detail. In this regard, the interior casing 210, the outermost casing panels 214, and the air plenum casing panels 216 are shown in the fully assembled state in this cross section, and that helps show both the heat exchange fins 236 and the plenum 238 defined around the external surface 234.

The air flow or combustion products from the IR burners 218 is exhausted via outlets 256 that are oriented to face towards the interior casing 210 at a bottom portion thereof. The air flow then enters an inlet end of the plenum 238 to begin carrying heat energy by convection for transfer through the interior casing 210 and into the cooking medium 40. FIG. 7 also reveals the bottom wall 222 for the first time, as well as the portions of the opposing sidewalls 224 defining the contour and profile of the cooking chamber. More specifically, each of the opposing sidewalls 224 further includes a lower sidewall panel 260 connected to and extending upwardly from the bottom wall 222, a central sidewall panel 262 connected to and extending from the lower sidewall panel 260 at an opposite end from the bottom wall 222, and an upper sidewall panel 264 connected to and extending from the central sidewall panel 262 at an opposite end from the lower sidewall panel 260. The central sidewall panel 262 is angled from each of the lower sidewall panel 260 and the upper sidewall panel 264 as shown, and exemplary such angles and sizes defined by these opposing sidewalls 224 are described in further detail below. Relative to the corresponding portions of the external surface 234, the air entering the plenum 238 begins flowing along the outside of the lower sidewall panels 260 before moving upwardly and then longitudinally along the central sidewall panels 262 and the upper sidewall panels 264. The specific flow is guided by the orientation and layout of the heat exchange fins 236, which are only positioned along the central sidewall panels 262 and the upper sidewall panels 264 in this embodiment. The flow along these opposing sidewalls 224 is configured to generally evenly spread heat energy along the external surface 234 so that generally uniform heating of the cooking medium 40 occurs within the fry pot 12.

As described above, the outlets 256 of the IR burners 218 are oriented to face towards the lower sidewall panels 260 on the opposing sidewalls 224. Furthermore, the mounting of the IR burners 218 in the air plenum casing panels 216 is configured to orient these outlets 256 generally parallel to the lower sidewall panels 260. The outlets 256 are designed to be as large as possible to allow for direct radiation with infrared of substantially an entirety of the corresponding surfaces of the lower sidewall panels 260. Consequently, the heat energy emitted by radiation and air-based convection is generally evenly spread over the entirety of both lower sidewall panels 260, thereby avoiding the formation of hot spots that may otherwise occur in a non-parallel or non-spaced arrangement of these elements. The lower sidewall panels 260 and/or other portions of the external surface 234 may be further painted with an infrared absorbing paint, which helps further enhance the uniform heat transfer and extraction of energy emitted by the IR burners 218. Although these lower sidewall panels 260 do receive some small portion of convection or air flow-based heat transfer, a substantial portion of the heat exchange is direct radiation from the IR burners 218, which again, occurs along essentially the entirety of the lower sidewall panels 260.

Figure 8:
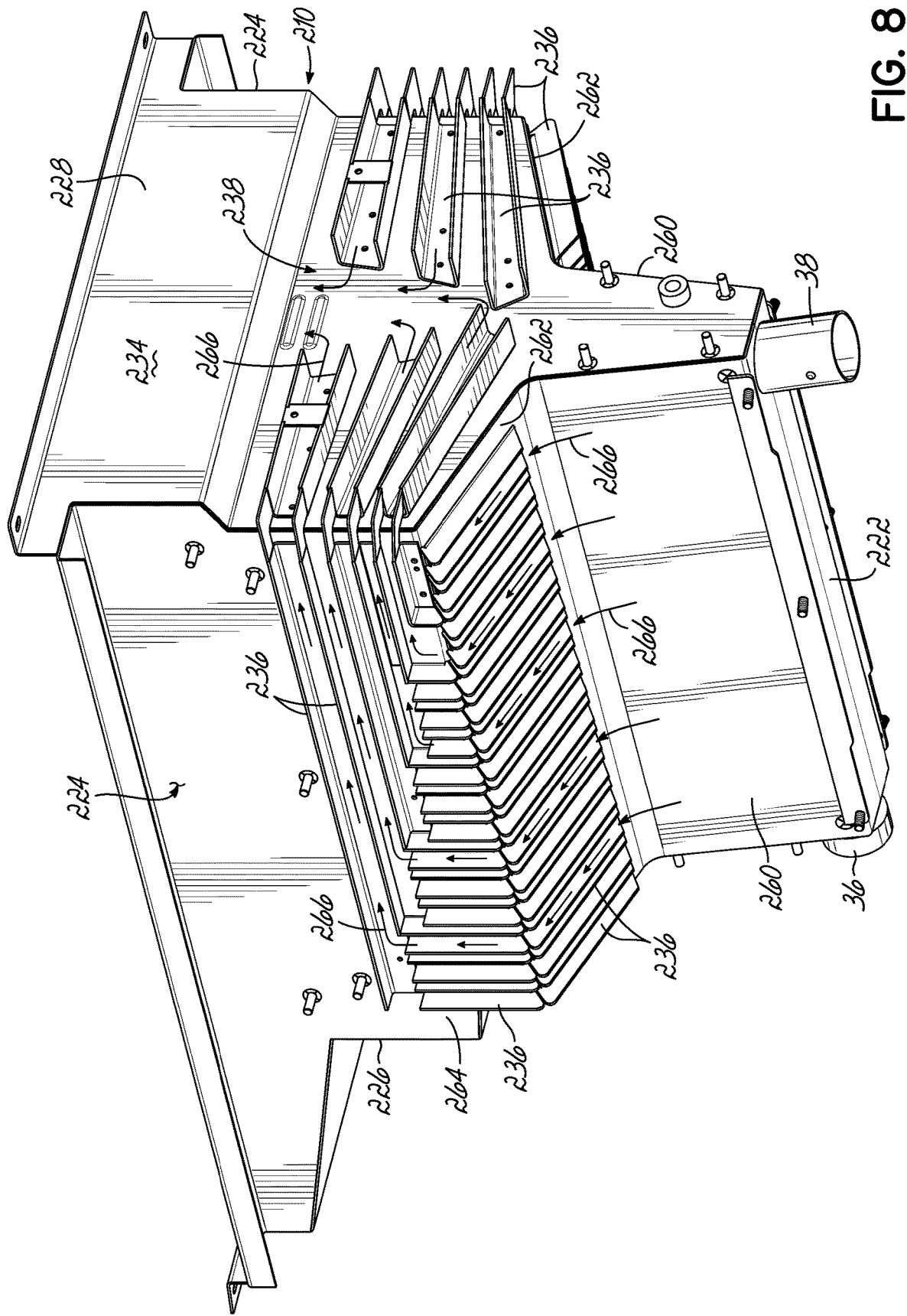
FIG. 8 is a rear perspective view of the fry pot of FIG. 3, with the exterior casing removed to show further details of the heat exchange fins and the interior casing.

Now turning to FIG. 8, the particular arrangement of the heat exchange fins 236 and the air flow through the plenum 238 is shown in greater detail. As described initially above, the heat exchange fins 236 are provided solely along the central sidewall panels 262 and the upper sidewall panels 264 in this embodiment, as those are the areas of the external surface 234 that do not receive much, if any, direct infrared energy via radiation output from the IR burners 218. The heat exchange fins 236 are also positioned along the rear end wall 228 and at the corners between the opposing sidewalls 224 and the rear end wall 228. The plurality of heat exchange fins 236 effectively define flow passages or flow paths between the interior casing 210 and the air plenum casing panels 216 that divide the air flow in the plenum 238 and deliver it to an outlet region adjacent an entry into the exhaust chimney 240, which is not shown in this FIG. 8 but is located where the flow arrows 266 of this Figure terminate. It will be understood that the air plenum casing panels 216 are in contact with the external ends of each of the heat exchange fins 236 to guide flow from end to end of the plenum 238, and the heated air cannot escape away from the interior casing 210 as would be the case in the absence of such panels (and as shown in the simplified illustration of FIG. 8 without such panels).

The heat exchange fins 236 in this embodiment of the fry pot 12 are defined mostly by U-shaped cross section pieces of material wherein the bottom side of the U-shape is connected in direct contact with the interior casing 210. The opposing arms of the U-shape extend directly outwardly in a generally perpendicular orientation to the interior casing 210 so as to extend between the interior casing 210 and the air plenum casing panels 216. Such elements can be spot welded into fixed relation relative to the interior casing 210, or these elements can be connected to the interior casing 210 with fasteners at the bottom side of the U-shape. Additional portions of the heat exchange fins 236 are defined by generally planar fin-like elements that simply project away from the connection point along one edge with the interior casing 210. Such planar fin-like elements may be used at the corner junctions between the opposing sidewalls 224 and the rear end wall 228 for example, as it may be difficult to bend a U-shape element to move around these corner junctions.

Regardless of the particular type of fin-forming structures chosen for the heat exchange fins 236, these fins 236 can be formed from a metallic material such as 304 or 441 stainless steel with a thickness of about 0.063 inches (0.16 cm) such that additional surface area for heat transfer from the air flow into the body of the fry pot 12 is provided. To this end, the heat exchange fins 236 both direct the air flow in the plenum 238 and also increase the surface area for heat exchange in the zones not provided with direct infrared radiation (e.g., the lower sidewall panels 260). To this end, the provision of the heat exchange fins 236 helps increase the convection air-based heat transfer in these sections to be generally uniform with the convection and radiation heat exchange at the lower sidewall panels 260. In other embodiments, the heat exchange fins 236 may be made from other materials or be coated in parts by ceramic material (or made from ceramic to contain the heated gasses long enough to supply appropriate amounts of heat transfer). In addition to making the heat exchange uniform across much of the external surface 234, the provision of the fins 236 allows for the IR burners 218 to be made smaller and with more heat density than prior designs (as initially described above as well).

The heat exchange fins 236 in this embodiment extend in a generally vertical orientation along both of the central sidewall panels 262, causing the air flow to move in a generally vertical direction (along the profile of the central sidewall panels 262). This is visible in FIG. 8, but also more clearly in FIGS. 9 and 10. A partial portion of the heat exchange fins 236 along the upper sidewall panels 264 also extends in this same vertical orientation, but another portion of the heat exchange fins 236 along these panels extends in a generally horizontal orientation. Thus, as the air flow in the plenum 238 moves upwardly along the passages defined at the heat exchange fins 236 on the upper sidewall panels 264, the air flow eventually encounters and is redirected to flow in a longitudinal rearward direction by the change of direction in the heat exchange fins 236. The air flow then continues moving in a generally horizontal flow to the corner junctions between the opposing sidewalls 224 and the rear end wall 228. The heat exchange fins 236 continue around the corner junctions and on the rear end wall 228 to continue guiding air flow in a generally horizontal manner towards the exhaust chimney 240.

Figure 10:
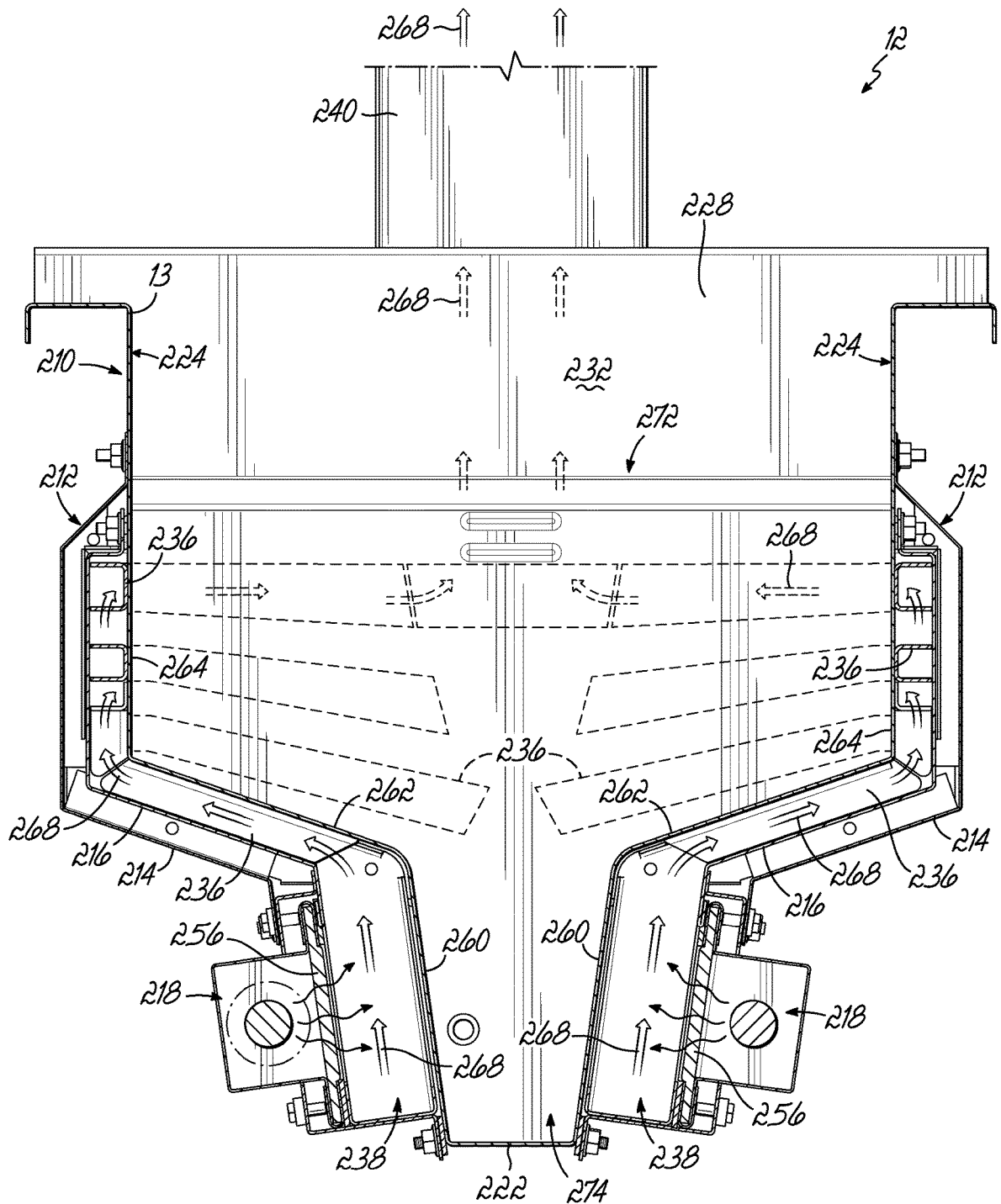
FIG. 10 is a front cross-sectional view of the fry pot of FIG. 9, taken generally along section line 10-10 in that same Figure.

As shown in FIGS. 8 and 10, the fins 236 along the rear end wall 228 may splay or spread outwardly slightly from one another along their length to accommodate the increasing surface area of the rear end wall 228 along this region of the fry pot 12. Therefore, the passages between the fins 236 expand slightly in size along the length thereof at the rear end wall 228, and the corresponding air flow is both horizontal and slightly downward along these passages. The expanding size of these passages between the heat exchange fins 236 also provides an additional design feature, that being a highest point of flow constriction at the corner junctions because these areas of the plenum 238 have the smallest flow cross section. That flow cross section controls the speed and flow of combustion gasses and heated air through the entirety of the plenum 238, and therefore is chosen to provide the desired air flow for generally uniform heating of the sides and rear of the interior casing 210. This flow cross section is also chosen such that a low pressure drop occurs via flow between the blower 244 and the exhaust chimney 240. The low pressure drop allows for use of a lower-capacity or size blower 244 for the system, while also reducing any tendencies for heated air and combustion gasses to leak from the plenum 238. In summary, the design of the heat exchange fins 236 and the flow paths through the plenum 238 allow for uniform heat transfer from the IR burners 218 that is highly energy efficient (and thereby allows for high temperature and uniformity on the cooking medium side) while also using a minimized pressure drop for the air flow, both of which are desirable in fryer designs.

Figure 9:
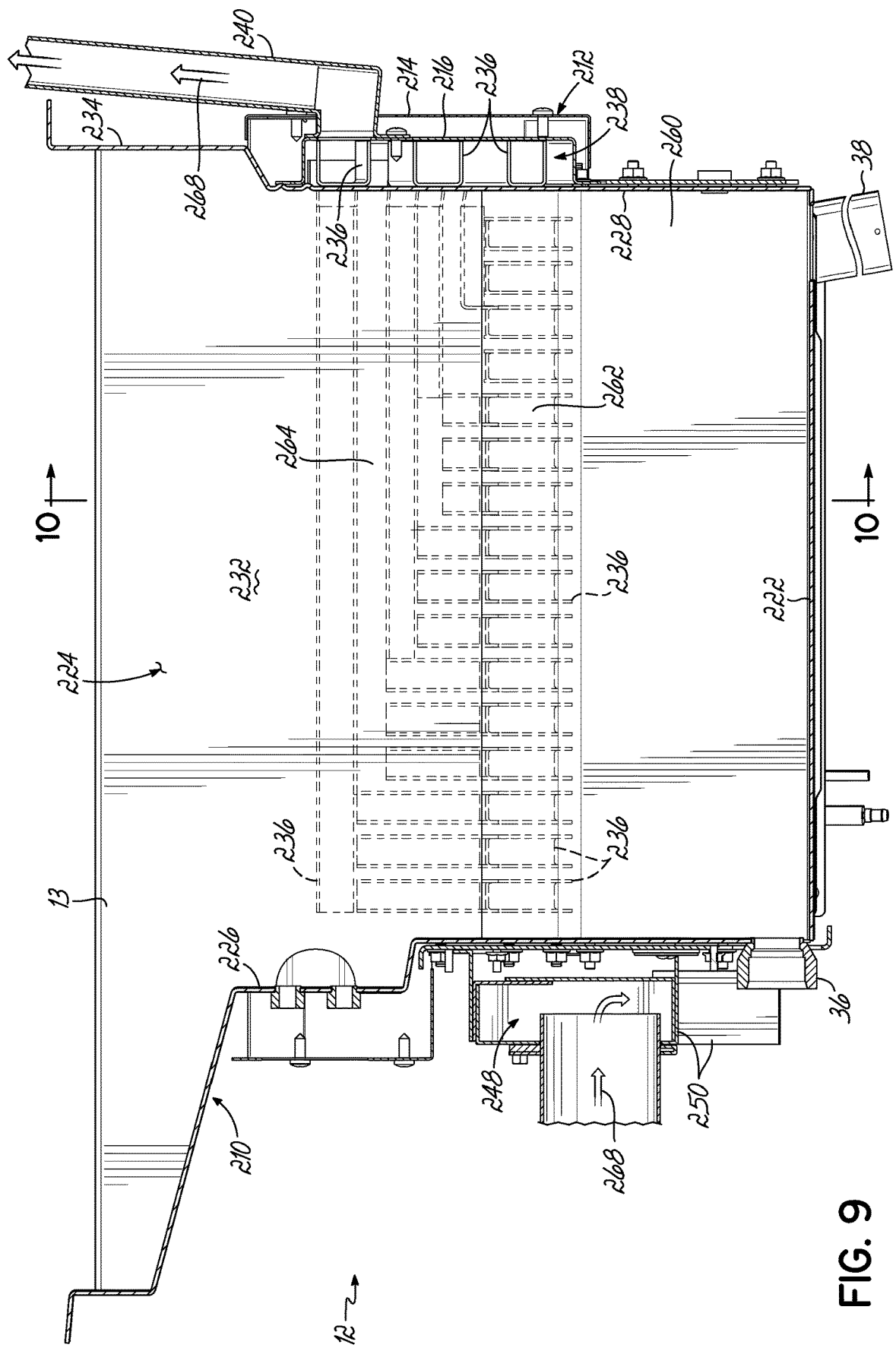
FIG. 9 is a side cross-sectional view of the fry pot of FIG. 3, taken generally along section line 9-9 in FIG. 4.

In addition to showing additional flow arrows 268 indicating the air flow movement (and combustion gas movement) through the exterior portions of the fry pot 12, FIGS. 9 and 10 provide face on views of the heat exchange fins 236 to further define their arrangement and orientations. These Figures also provide a detailed profile of the walls defining the interior casing 210 as well, including the front and rear end walls 226, 228 and the opposing sidewalls 224 extending upwardly from the bottom wall 222. It will be appreciated that the cooking chamber defined inside the interior casing 210 effectively includes an upper chamber portion 272 located along the central sidewall panels 262 and the upper sidewall panels 264, and a lower chamber portion 274 located along the lower sidewall panels 260. The upper chamber portion 272 is sized to receive baskets of food product to be cooked, for example, while the lower chamber portion 274 is configured to receive a minimized volume of cooking medium 40 for effective heat transfer from the radiation and convection described in detail above. The lower chamber portion 274 is also where the drain port 38 would be located, so this small region is where any particulate or debris would be collected for flushing out of the fryer 10. The uniform heat transfer and the sizing of these chamber portions allows for a minimized amount of cooking medium 40 to be used, which is less than conventional fryer designs and thereby helps reduce the overall cost of operating the fryer 10.

It is also shown in FIGS. 9 and 10 that while the rear end wall 228 has a mostly vertical and flat configuration, the front end wall 226 includes some angled portions that project a significant amount horizontally from the remainder of the cooking chamber. This extension of the front end wall 226 provides space to mount the blower 244 and other components within the cabinet 16, while also spacing the front of the fryer 10 and an operator that may be standing there from the hot, cooking medium-containing zones of the fryer 10. However, it will be understood that the particular layout and arrangement of these walls of fry pot 12 may be modified in other embodiments, so long as a minimized cooking medium volume continues to be used for efficiency purposes (both in reduced cooking medium usage as well as highly efficient heat exchange and heat extraction of the energy produced by the IR burners 218).

Figure 11:
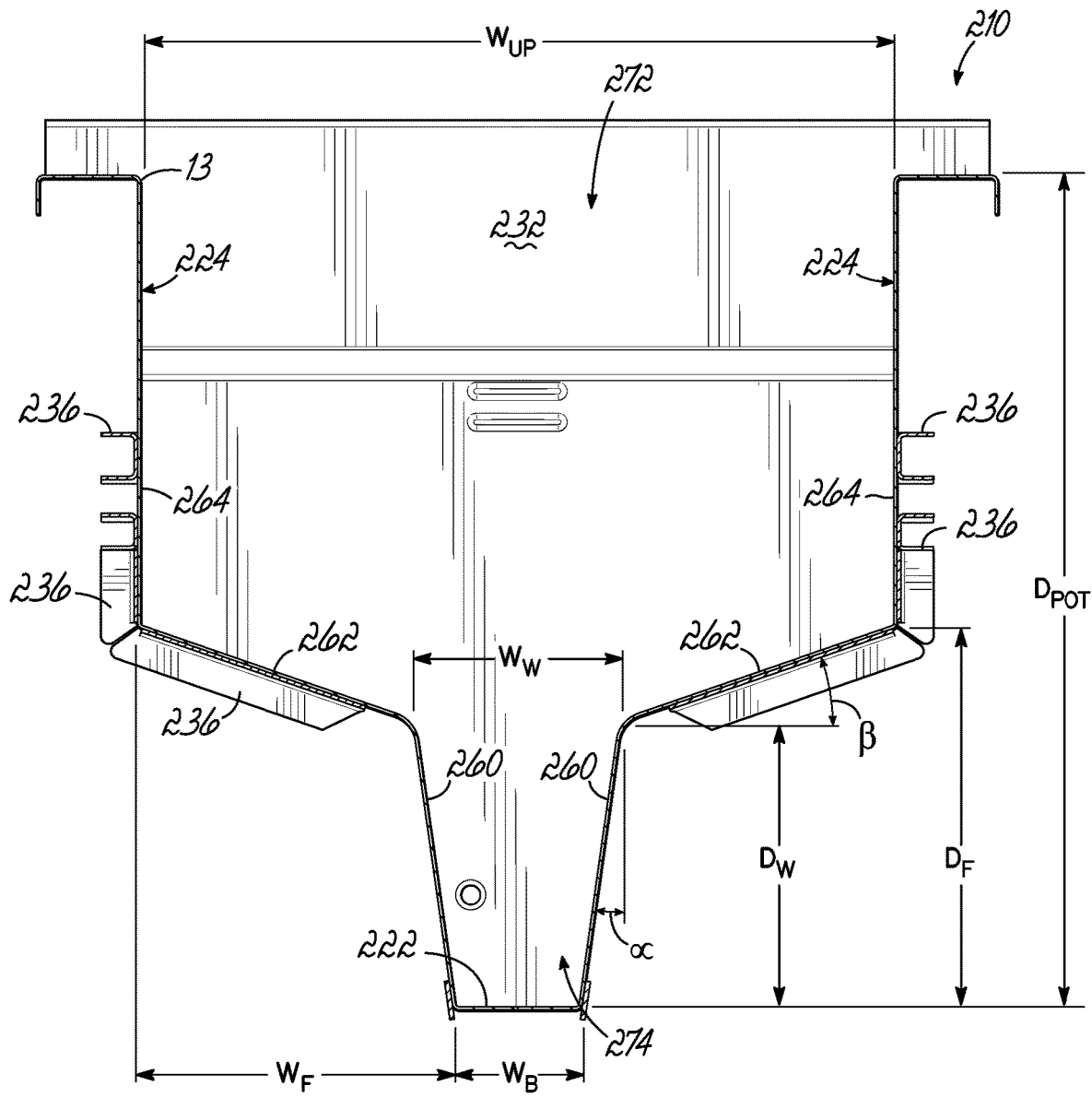
FIG. 11 is a front cross-sectional view of the fry pot similar to FIG. 10, but with exterior elements mostly removed to reveal additional dimensions and profile features of the interior casing defining the cooking chamber.

Although the cross-sectional profile of the cooking chamber defined by the interior casing 210 is shown in FIGS. 9 and 10, FIG. 11 is provided as a simplified cross section to allow for focus on the advantageous dimensions and angles of this cooking chamber design, at least according to one embodiment developed by the inventors of this application. To this end, the profile of the opposing sidewalls 224 defines the overall size and shape for minimized oil volume use in the fry pot 12 while also allowing for the generally uniform heat exchange across many large surfaces at the external surface 234 of the interior casing 210, when used in combination with the heat exchange fins 236 as set forth above. Furthermore, the specific profile of these opposing sidewalls 224 and the interior casing 210 generally provides a desirable ornamental and aesthetic appearance for users looking into the opening 13 of the fry pot 12, these ornamental-type features being in addition to the advantages associated with the heat exchange described in detail above and the cleaning process described in some further detail below.

With specific reference to FIG. 11, several exemplary dimensions of the interior casing 210 of this embodiment of fry pot 12 are shown. In this regard, the upper sidewall panels 264 are oriented generally vertically and parallel to one another, with the largest width of the cooking chamber defined between these upper sidewall panels 264. This width $W_{UP}$ of the upper chamber portion 272 is about 12.2 inches, for example, and this value may be limited or set by the space within the cabinet 16 of the fryer 10. Regardless, it will be understood that small variations of ±1.0 inch are possible for $W_{UP}$. As described above, the central sidewall panels 262 are angled inwardly from the generally vertical upper sidewall panels 264, and the lower sidewall panels 260 are also angled from the central sidewall panels 262 to provide the cooking chamber with a generally tapered configuration from top to bottom. The central sidewall panels 262 may be considered to form a flank of the cooking chamber, while the lower sidewall panels 260 may be considered to form a well of the cooking chamber (also referred to herein as the lower chamber portion 274). As shown in FIG. 11, the central sidewall panels 262 extend inwardly from the upper sidewall panels 264 such that the top end of the well defines a well width $W_W$ of about 2.48 inches. The lower sidewall panels 260 then extend farther inwardly from the central sidewall panels 262 such that the bottom end of the well and the bottom wall 222 defines a bottom wall width $W_B$ of about 1.5 inches. It will be understood that small variations of about ±0.25 inches are possible for each of these widths $W_W$ and $W_B$ associated with the well. Regardless of the particular width dimensions selected within these ranges, the well width $W_W$ is advantageously at least 1.3 times the size of the bottom wall width $W_B$, and in the preferred embodiment shown, at least 1.6 times the size of the bottom wall with $W_B$. These various widths define the tapered configuration and profile of the cooking chamber within the interior casing 210.

Several depths are also shown for the exemplary embodiment in FIG. 11. To this end, the well or the lower chamber portion 274 defines a well depth $D_W$ of about 3.49 inches, which is also defined by the vertical height of the lower sidewall panels 260 in the angled orientation shown. The central sidewall panels 262 extend a farther distance upwardly from the lower sidewall panels 260 to thereby define a flank depth $D_F$ of about 4.64 inches, this flank depth $D_F$ being measured from the bottom wall 222 (the specific depth of just the flank portion at the central sidewall panels 262 would then be $D_F-D_W$, for example). It will be appreciated that each of these depths $D_W$ and $D_F$ can include small variations of ±0.50 inches from these examples shown in FIG. 11, without departing from the scope of the invention. The overall depth $D_{POT}$ of the fry pot 12 is also shown in FIG. 11, and this overall depth $D_{POT}$ is about 13.5 inches in the embodiment shown (subject to similar small variations as the depths described above), this value also being measured from the bottom wall 222. The portion of the overall depth $D_{POT}$ that is associated with the vertical height of the upper sidewall panels 264 is essentially fixed in all fryer designs based on needs for cooking food loads and a surge zone that is provided as a safety buffer. However, the depth defined by the flank and the well as shown at $D_F$ is much shallower or smaller than typical fryer designs as a result of the heat exchange features described above in combination with the profile shown in FIG. 11.

Regardless of the particular width and depth dimensions selected within the ranges above, the well is formed with a shallow depth while providing easy access for cleaning thanks to the relative size of the top of the well relative to the shallow depth. To this end, the well depth $D_W$ in the preferred embodiment is less than or equal to 1.5 times the size of the well width $W_W$.

The exemplary depths and widths described above help define the angles from vertical or horizontal of the lower sidewall panels 260 and the central sidewall panels 262. The lower sidewall panels 260 are oriented at a well angle α of about 8°, as measured from a vertical direction as shown. The central sidewall panels 262 are oriented at a flank angle β of about 19°, as measured from a horizontal direction as shown. Both of these angles may vary by small amounts based on the small variations in depths and widths that are possible in other embodiments as set forth in detail above. The flank angle β of about 19° is a relatively gentle slope in the vertical direction, but this angle is still sufficient to help encourage flow of solids and particulate debris matter downwardly off of the flank surfaces defined by the central sidewall panels 262 and into the well during operation of the fryer 10. The much sharper angling at the lower sidewall panels 260 relative to the vertical direction, defined by the well angle α of about 8°, tends to let solid particulate and debris fall down into the very bottom of the well adjacent the bottom wall 222, and this location may be a "cold zone" that is typically at a slightly lower temperature than the remainder of the cooking chamber. Thus, crumbs and crackling and the like do not tend to burn or stick in the well defined by the lower chamber portion 274, which allows for these elements to be washed out of the drain port 38 easily during filtration or cleaning cycles.

In addition to assisting with flow of any debris or particulate to the bottom of the well during operation, to thereby avoid burning of particulate that could lead to lower lifespans for the cooking medium 40, the angles of the well and the flank provide additional benefits.

For example, the angles chosen and the increased width at the top of the well ($W_W$) compared to the bottom of the well ($W_B$) improves visibility of the lower chamber portion 274 and access for hands and cleaning tools used to scrape or scrub clean surfaces of the fry pot 12 during a cleaning process. As noted above, this cleaning often occurs while the fry pot 12 is still relatively hot, so as to reduce overall downtime for cleaning, and improved visibility and easier access can thereby help users avoid contact with hot surfaces at the central sidewall panels 262 and/or at the lower sidewall panels 260. It will be understood that even if the depth of the well is modified with small variations as set forth above, the top width of the well should also be modified accordingly to maintain these well and flank angles and the access benefits for cleaning processes.

Furthermore, the overall shallower depth of the well and the angles of the flank and the well contribute together to form a shallower depth overall at the well and flank (measured as $D_F$), which contains less cooking medium volume than conventional designs with similar cooking spaces (e.g., at the upper chamber portion 272). That shallower depth or distance between the top of the flank and the bottom wall 222 both makes it easier for a user to reach the bottom wall 222 and the well during cleaning processes, and also allows extra space or vertical clearance within the cabinet 16 underneath the fry pot 12 for a generally vertical drain port 38 to be provided, as shown in previous Figures like FIGS. 8 and 9. To this end, conventional fryer designs with deeper wells typically use generally horizontal drain ports (oriented along a generally horizontal axis instead of vertical) as a result of limited space within the cabinet 16, but such horizontal drain ports are easily subject to clogging and tend to be much harder to access with hands and tools for cleaning. In contrast, the generally vertical drain port 38 used with the fry pot 12 of the current invention is less subject to clogs thanks to gravity assisting with clearance of particulate and debris when cooking medium flows out of the cooking chamber for filtration or replacement. Likewise, the vertical drain port 38 is more easily visualized and accessed for cleaning when required as compared to horizontal drain ports, which leads to an overall reduction in time required for cleaning the fry pot 12.

Therefore, the heat exchange features provided on an exterior of the fry pot 12 and the angling and profile of walls within the interior casing 210 collectively provides several advantages in functionality over conventional gas fryer designs. In this regard, the shallower depth and tapered design of the well allows for easier access for cleaning and the use of an easy-to-clean vertical drain port 38, while also reducing the size of the IR burners 218 and air flow (e.g., the blower 244) that needs to be used. The cooking chamber contains less cooking medium overall thanks to the shallower depth at these portions of the cooking chamber. Furthermore, cooking medium usage is also reduced because solid particulate and other debris is encouraged by the profile of the interior casing 210 to move to the bottom of the well along the bottom wall 222 rather than stick and burn on heated surfaces such as the lower sidewall panels 260 and the central sidewall panels 262, and this lack of burning crumbs or crackling increases the useable lifespan of the cooking medium. Moreover, the use of the smaller IR burners 218 (having higher heat density) in combination with air flow through the plenum 238 and heat exchange fins 236 spreads the heat exchange to be generally uniform across a substantial portion of the external surface 234 of the fry pot 12, specifically along essentially the entirety of the opposing sidewalls 224 and the rear end wall 228. This uniform heat exchange heats the cooking medium in a controlled, uniform manner as well, which avoids overheating and hot spots that could rapidly degrade cooking medium quality. In combination, the use of less overall cooking medium volume and the increase of lifespan of the cooking medium, which is enabled by the uniform heating and the easier cleaning/removal of particulate, collectively leads to a reduction in cooking medium use of 10% or even more as compared to conventional 30-lb gas fryers.

With reference to FIGS. 12 through 16, another embodiment of a fry pot 312 that can be used with the fryer 10 is shown. The fry pot 312 contains many of the same elements as the exemplary embodiment described above, and these elements are numbered with similar reference numbers where functionally similar or identical to the description provided above. The primary difference in this fry pot 312 is the use of a split vat cooking chamber instead of a unitary space cooking chamber for receiving cooking medium and food products to be cooked. The split vat cooking chamber effectively defines first and second sub fry pots 312a, 312b each configured to receive a smaller batch of food product for cooking as compared to the previous embodiment's cooking chamber. To this end, the interior casing 310 of this embodiment further includes a divider wall 380 that is mostly vertical in orientation and extends along a longitudinal center of both the upper chamber portion 372 and the lower chamber portion 374 (which are understood to be divided into corresponding portions 372, 374 for each sub fry pot 312a, 312b). The divider wall 380 forms a small gap 382 between the sub fry pots 312a, 312b, which can enable independent heating and control of the cooking medium in each sub fry pot 312a, 312b when desired, such as when only one sub fry pot 312a, 312b needs to be in active use.

Figure 12:
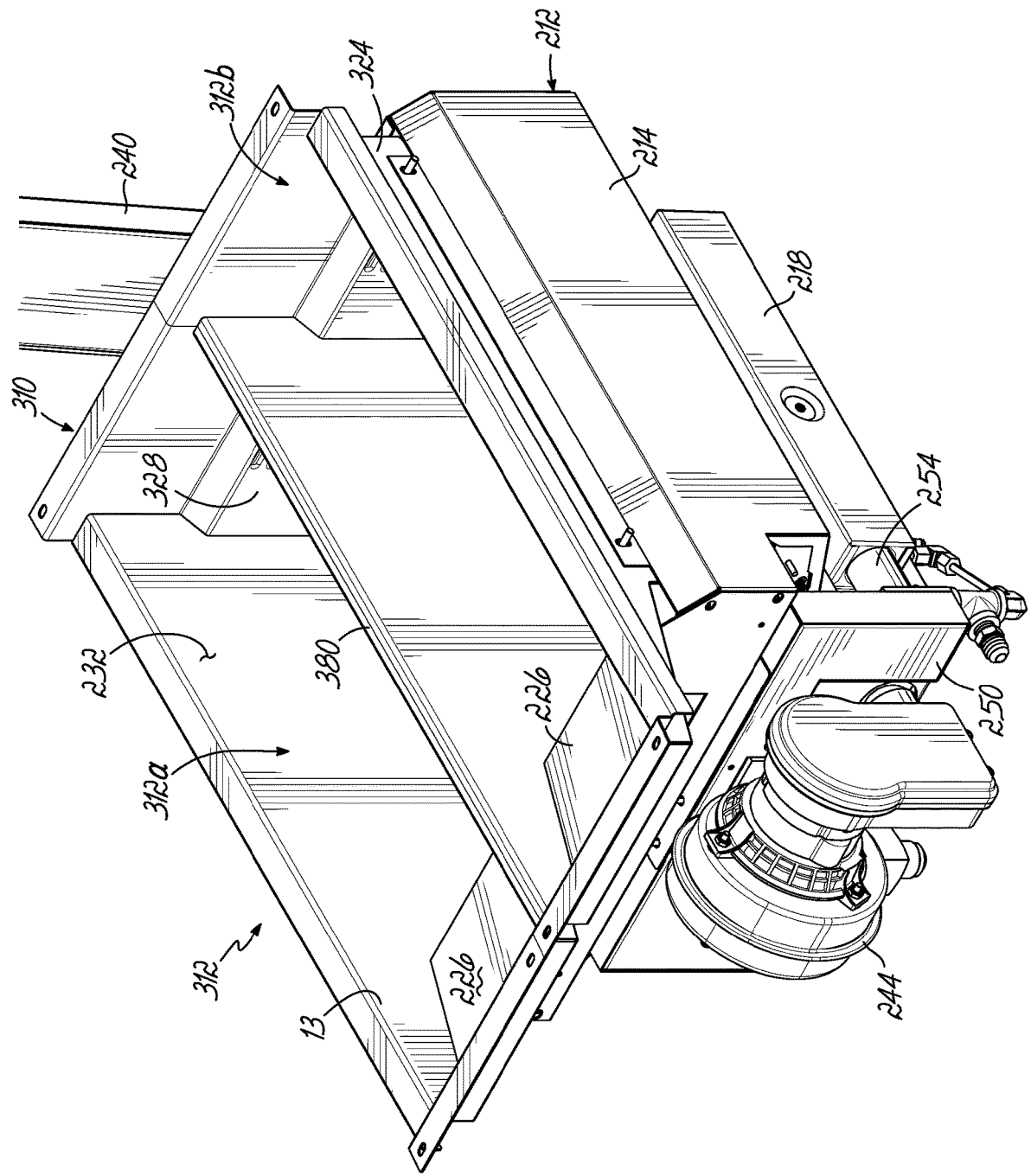
FIG. 12 is a top front perspective view of another embodiment of one of the fry pots that can be used with the fryer of FIG. 1, this fry pot including a split vat cooking chamber.
Figure 13:
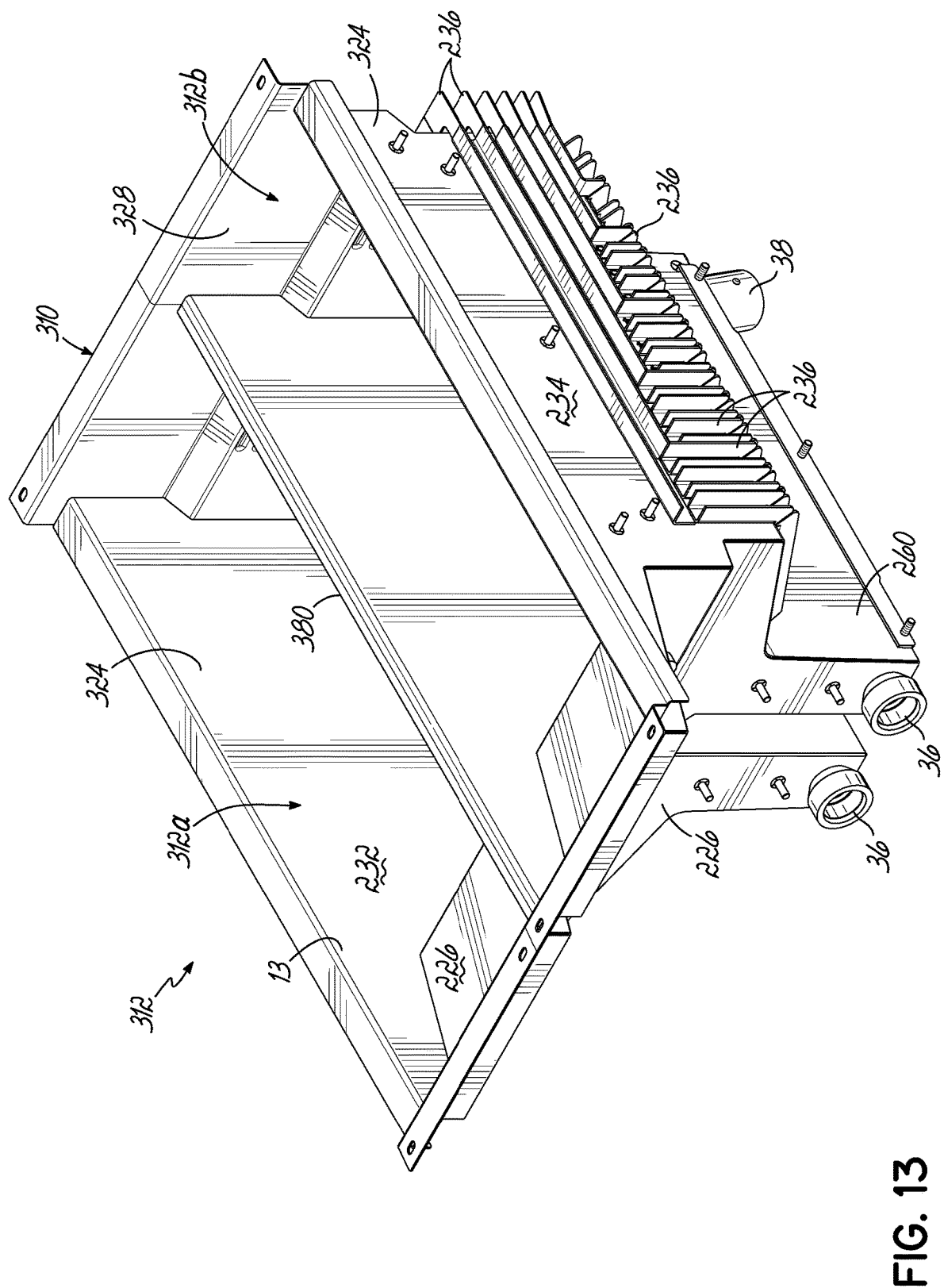
FIG. 13 is a perspective view of the fry pot of FIG. 12, with some external features removed to reveal heat exchange features along an exterior thereof.
Figure 14:
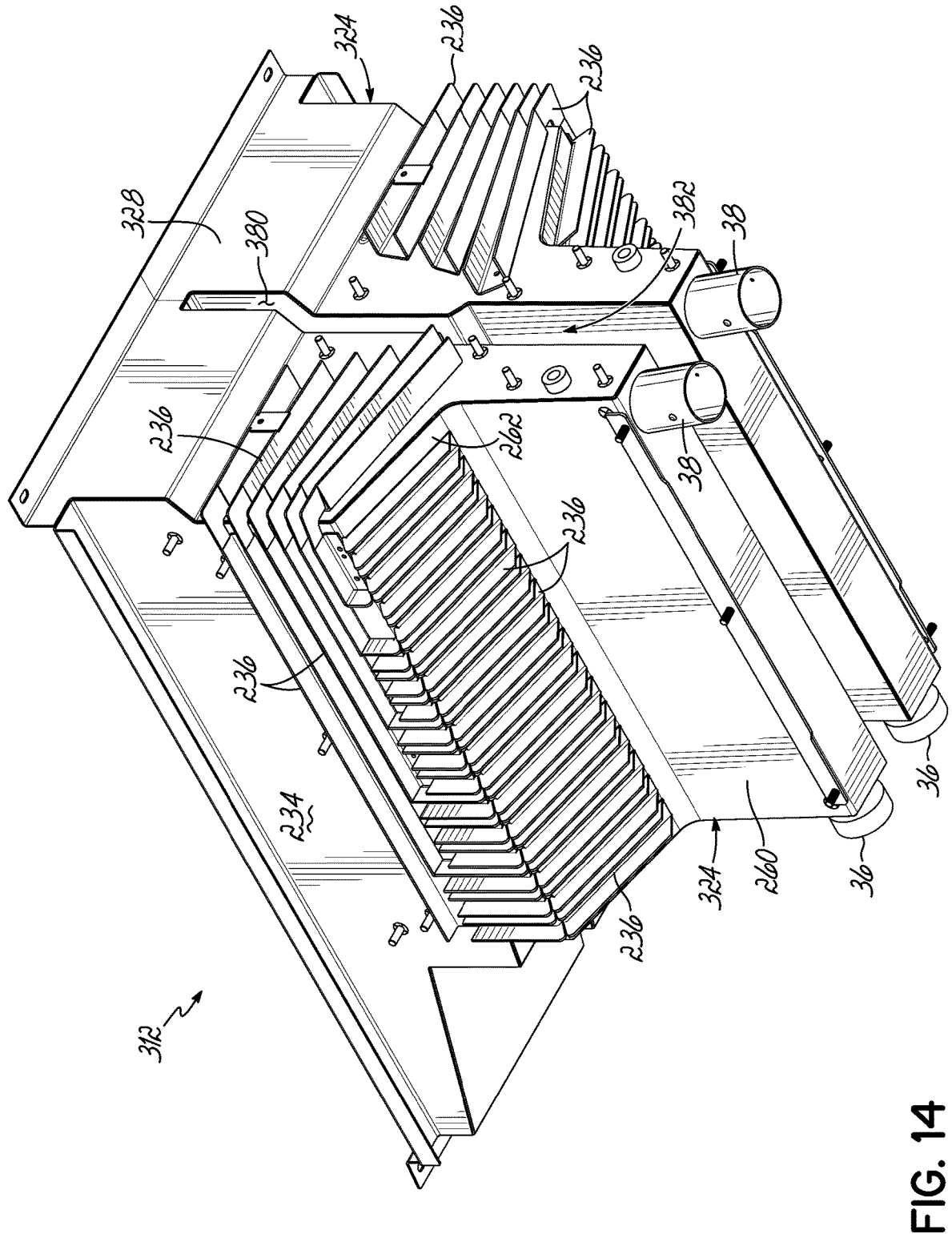
FIG. 14 is a bottom rear perspective view of the fry pot of FIG. 13, with the exterior casing removed to show further details of the heat exchange fins and the interior casing.
Figure 15:
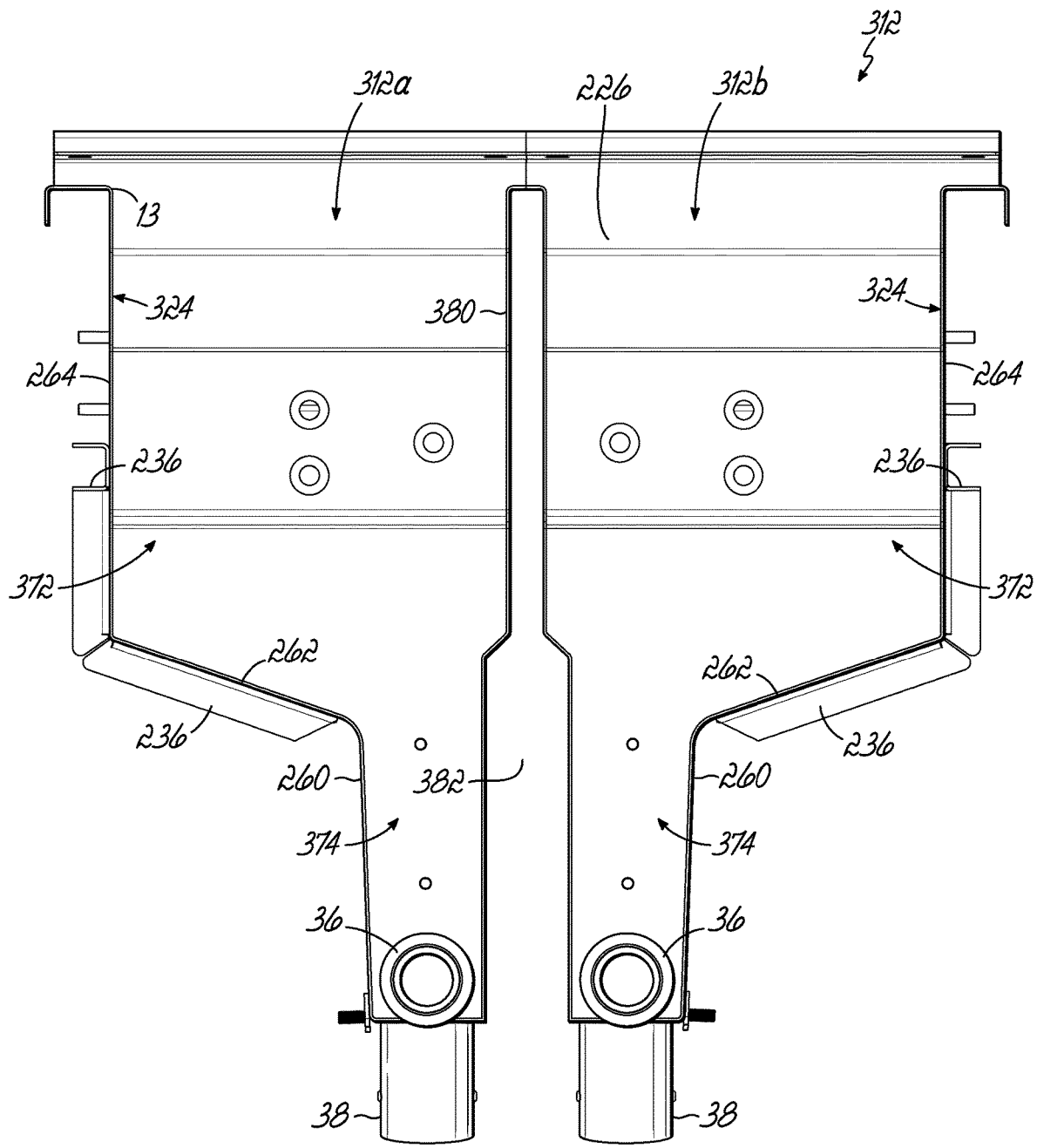
FIG. 15 is a front view of the fry pot of FIG. 12, but with exterior elements mostly removed to reveal profile features of the interior casing defining the cooking chamber.
Figure 16:
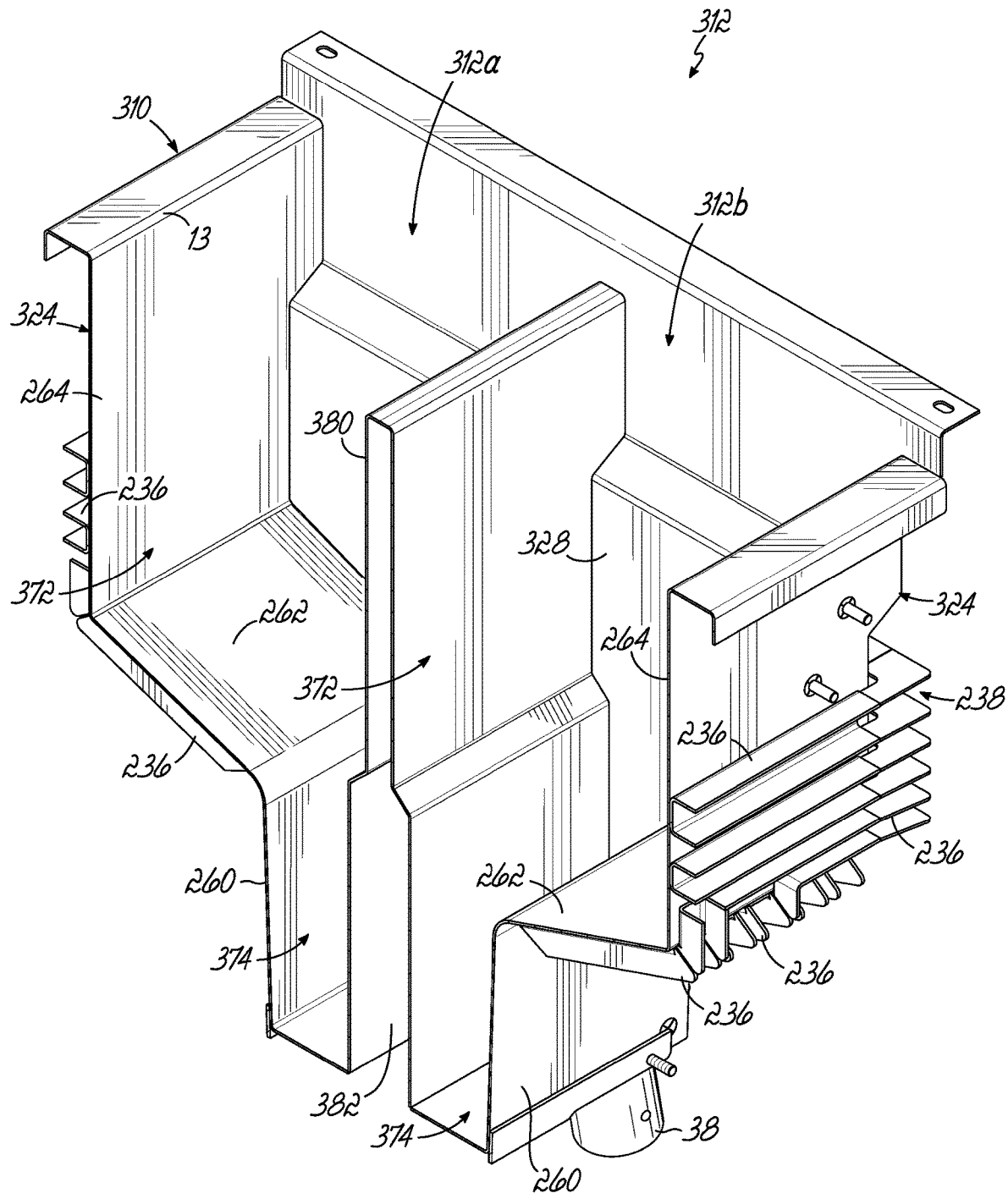
FIG. 16 is a cross-sectional perspective view of a central portion of the fry pot of FIG. 12.
Figure 17:
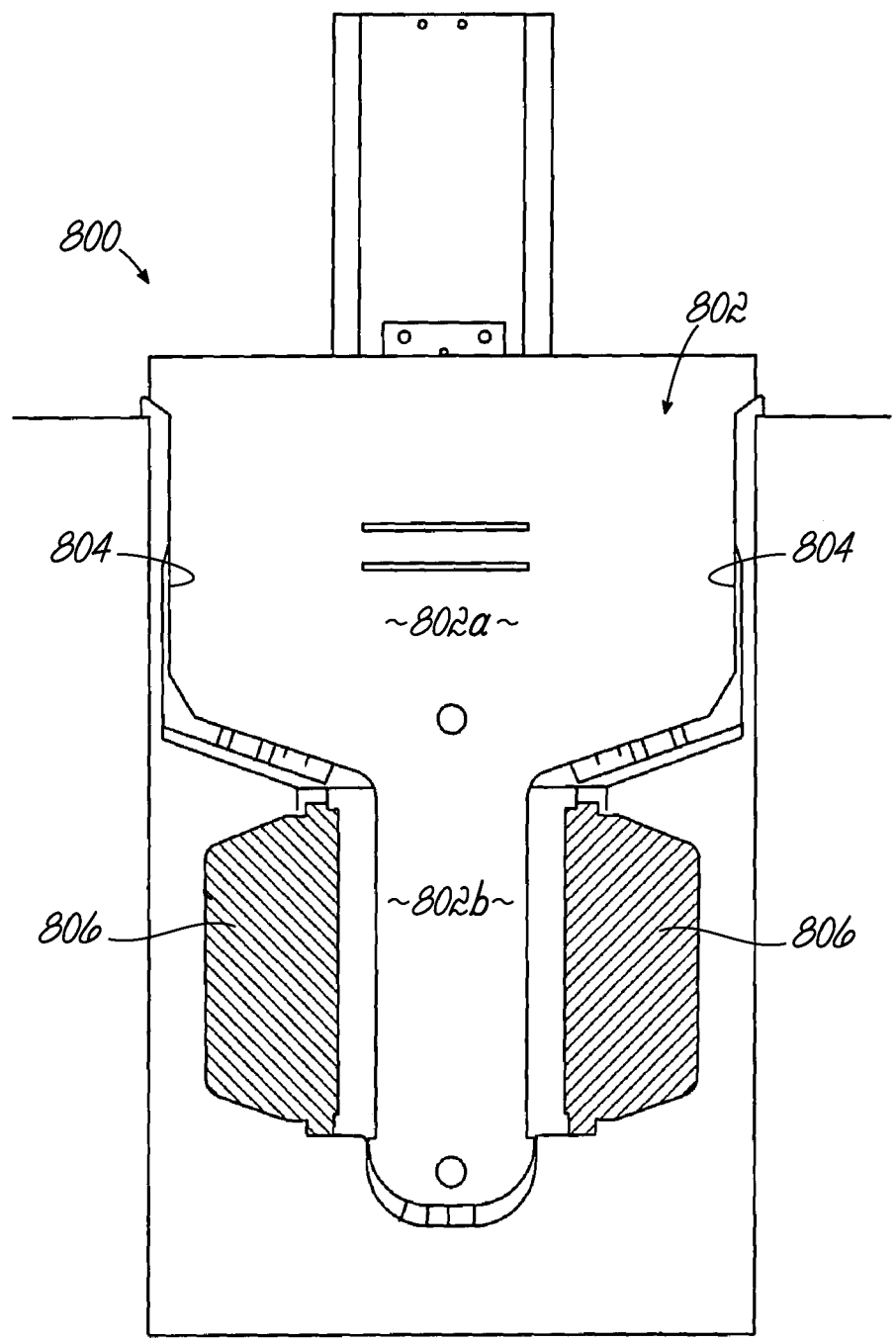
FIG. 17 is a front cross section of a conventional gas fryer fry pot.

In substantially all other respects, the fry pot 312 of this embodiment is configured and operates in the same manner as the previous embodiment. To this end, the external features for heat exchange including the exterior casing 212 formed by outermost casing panels 214 and air plenum casing panels 216, the IR burners 218, the heat exchange fins 236, the plenum 238, and the exhaust chimney 240 are all provided again and used in providing generally uniform heat exchange over the opposing sidewalls 324 and the rear end wall 328. Once again, the uniform heating over generally large surface areas avoids the formation of hot spots in the cooking medium in the fry pot 312, thereby increasing the functional lifespan of that cooking medium by avoiding heat-based preliminary degradation thereof. A single blower 244 is shown in FIG. 12 as feeding the plenum 238 on both sides, but it will be understood that separate blowers could once again be provided, particularly if independent heat control is desired for the sub fry pots 312a, 312b.

The internal profile of the interior casing 310 in this embodiment of the fry pot 312 is generally similar as in the previous embodiment, with a couple of adjustments made in view of the provision of the divider wall 380. For example, the opposing sidewalls 324 continue to include lower sidewall panels 260 defining a well (with the lower chamber portions 374), central sidewall panels 262 defining a flank, and upper sidewall panels 264 defining upper chamber portions 372. The lower and central sidewall panels 260, 262 continue to be angled so as to define at least some tapering from the top of the flank to the bottom of the well in both sub fry pots 312a, 312b. It will be appreciated that the flank and well angles may vary a small amount from those shown in the previous embodiment, such as the well angle being steeper and closer to vertical. Nevertheless, these elements of the interior casing 310 continue to provide a tapered profile that provides easy visibility and access for cleaning, while also defining a shallower depth than conventional fryer designs. This also allows for the use of generally vertical drain ports 38 in both wells, as in the previous embodiment. In addition to benefits in cleaning processes, these profiles defined by the opposing sidewalls 324 encourage flow of solid particulate and debris into the bottom of the wells so that such particulate does not stick and burn at the lower sidewall panels 260 or the central sidewall panels 262, thereby increasing lifespan of the cooking medium. Accordingly, the fry pot 312 with the split vat cooking chamber of this embodiment continues to provide the benefits of easier cleaning and less cooking medium usage compared to conventional gas fryers, thanks to the internal profiles provided as well as the uniform heating of the cooking medium.

It will be understood that small variations in the configuration and layout of the features of the fry pot 312 are within the scope of this invention, as the exemplary illustrations provide but one example of the benefits and functionality of the gas fryer of this invention. Additionally, the features of the various embodiments described herein can be used together in any combination as will be understood by those skilled in the fryer art.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A gas fryer for cooking food products, comprising:
   a fry pot including an interior casing defining a cooking chamber configured to receive cooking medium that is heated to cook the food products, the interior casing including a bottom wall, front and rear end walls extending from the bottom wall, and opposing sidewalls connected to the front and rear end walls and also extending from the bottom wall, the fry pot also including an exterior casing spaced apart from the interior casing in several locations to define a plenum for air flow around an external surface of the interior casing;
   a plurality of heat exchange fins connected to the interior casing at portions of the opposing sidewalls and the rear end wall, the heat exchange fins extending between the interior casing and the exterior casing to form flow channels for air flow in the plenum; and
   at least one infrared burner that generates heat energy by combustion of gas for heating cooking medium in the fry pot,
   wherein the heat energy from the at least one infrared burner is transferred by radiation into the interior casing and also by convection into the interior casing based on air flow through the plenum that is heated by the at least one infrared burner, and
   the plurality of heat exchange fins is arranged in a configuration that guides the air flow to make transfer of the heat energy into the interior casing and the cooking medium generally uniform across at least the opposing sidewalls and the rear end wall,
   wherein each of the opposing sidewalls of the interior casing further comprises:
   an upper sidewall panel extending generally vertically from an opening into the cooking chamber;

a central sidewall panel connected to and extending at an angle from the upper sidewall panel, thereby defining a flank of the cooking chamber; and a lower sidewall panel connected to each of the bottom wall and the central sidewall panel, and extending at an angle from the central sidewall panel, thereby defining a well of the cooking chamber, wherein the heat exchange fins are positioned along the central sidewall panels and the upper sidewall panels of the opposing sidewalls, wherein at least a portion of the heat exchange fins are defined by U-shaped elements formed from stainless steel and fixedly coupled to the opposing sidewalls and the rear end wall to thereby increase a surface area for convection heat transfer from the air flow.

2. The gas fryer of claim 1, wherein the heat exchange fins divide the plenum into the flow channels, and the heat exchange fins are spaced apart from one another to define a flow cross section of the flow channels that is configured to minimize a pressure drop caused by air flow through the plenum.

3. The gas fryer of claim 1, wherein the at least one infrared burner includes first and second infrared burners positioned proximate to the lower sidewall panels of the opposing sidewalls, such that the uniform transfer of heat energy into the interior casing and the cooking medium is provided by radiation and convection along the lower sidewall panels and by convection with increased surface areas provided by the heat exchange fins along the central and upper sidewall panels.

4. The gas fryer of claim 1, wherein the lower sidewall panels are angled from a vertical orientation by a well angle, the central sidewall panels are angled from a horizontal orientation by a flank angle, and the well angle and flank angle are both acute angles such that the flank and the well of the cooking chamber define a tapered profile that narrows in width towards the bottom wall of the interior casing.

5. The gas fryer of claim 4, wherein the well angle is about 8° and the flank angle is about 19°.

6. The gas fryer of claim 4, wherein the lower sidewall panels are spaced from one another to define a well width at a top of the well and a bottom wall width at a bottom of the well, the well width being at least 1.3 times a size of the bottom wall width.

7. The gas fryer of claim 6, wherein the well width is at least 1.6 times the size of the bottom wall width.

8. The gas fryer of claim 4, wherein the lower sidewall panels are spaced from one another to define a well width at a top of the well, and the lower sidewall panels also define a well depth in the vertical direction between the central sidewall panels and the bottom wall, with the well depth being less than or equal to 1.5 times a size of the well width.

9. The gas fryer of claim 8, wherein the fry pot further includes a drain port communicating with the well of the cooking chamber, and the drain port is connected to the bottom wall and is oriented generally vertically.

10. The gas fryer of claim 9, wherein the well angle and the flank angle of the lower and central sidewall panels is configured to cause any solid particulate or debris within the cooking chamber to fall to the bottom wall at the well of the cooking chamber, and wherein the well depth and well width provide sufficient space for accessing the well and the drain port in cleaning cycles.

11. The gas fryer of claim 1, wherein the interior casing further includes a divider wall extending between the front and rear end walls to thereby separate the cooking chamber into first and second sub fry pots.

12. A method of cooking food products with a gas fryer, comprising:

filling a fry pot of the gas fryer with a cooking medium, the fry pot including an interior casing defining a cooking chamber for receiving the cooking medium, the interior casing defined by a bottom wall, front and rear end walls extending from the bottom wall, and opposing sidewalls extending from the bottom wall;

operating at least one infrared burner to generate heat energy by combustion of gas;

transferring the heat energy generated by the at least one infrared burner into the interior casing and the cooking medium to raise a temperature thereof, wherein the transfer of heat energy includes radiation from the at least one infrared burner and convection using air flow heated by the at least one infrared burner and flowed through a plenum formed along an external surface of the interior casing, wherein the fry pot also includes a plurality of heat exchange fins connected to the interior casing at portions of the opposing sidewalls and the rear end wall; and placing the food products in the cooking medium heated by the heat energy from the at least one infrared burner, for a period of time to cook the food products, the transferring of the heat energy from the at least one infrared burner into the interior casing being generally uniform across at least the opposing sidewalls and the rear end wall, wherein each of the opposing sidewalls of the interior casing includes an upper sidewall panel extending generally vertically from an opening into the cooking chamber, a central sidewall panel connected to and extending at an angle from the upper sidewall panel, and a lower sidewall panel connected to and extending at an angle from the central sidewall panel, and the generally uniform transferring of the heat energy from the at least one infrared burner into the interior casing further comprises:

transferring heat energy by radiation and convection along the lower sidewall panels; and transferring heat energy by convection along the central and upper sidewall panels, wherein the heat exchange fins are located along the central and upper sidewall panels to increase a surface area for convection heat transfer at these areas, wherein the transferring heat energy by convection along the central and upper sidewall panels is enhanced by providing at least a portion of the heat exchange fins as U-shaped elements formed from stainless steel and fixedly coupled to the opposing sidewalls and the rear end wall.

* * * * *